US010063669B2

(12) United States Patent
Nakata et al.

(10) Patent No.: US 10,063,669 B2
(45) Date of Patent: Aug. 28, 2018

(54) COMMUNICATION DEVICE, MANAGEMENT DEVICE, PROCESSING METHOD, AND COMPUTER-READABLE RECORDING MEDIUM HAVING PROCESSING PROGRAM STORED THEREIN

(71) Applicant: FUJITSU LIMITED, Kawasaki-shi, Kanagawa (JP)

(72) Inventors: Megumi Nakata, Kawasaki (JP); Takeshi Fujiwara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 185 days.

(21) Appl. No.: 14/243,462

(22) Filed: Apr. 2, 2014

(65) Prior Publication Data

US 2014/0334490 A1   Nov. 13, 2014

(30) Foreign Application Priority Data

May 7, 2013 (JP) ................................. 2013-097471

(51) Int. Cl.
*H04L 29/06* (2006.01)

(52) U.S. Cl.
CPC .............. *H04L 69/22* (2013.01); *H04L 69/08* (2013.01)

(58) Field of Classification Search
None
See application file for complete search history.

(56) References Cited

U.S. PATENT DOCUMENTS

| 5,742,905 | A  | * | 4/1998  | Pepe ........................ H04L 12/58 379/211.01 |
| 6,400,729 | B1 | * | 6/2002  | Shimadoi ................ H04L 69/32 370/466 |
| 7,215,637 | B1 | * | 5/2007  | Ferguson ................ H04L 45/00 370/230.1 |
| 7,620,735 | B2 | * | 11/2009 | Salim ................... H04L 12/5835 709/206 |
| 8,804,504 | B1 | * | 8/2014  | Chen ..................... H04L 69/324 370/229 |
| 9,246,819 | B1 | * | 1/2016  | Thirasuttakorn ..... H04L 47/125 |

(Continued)

FOREIGN PATENT DOCUMENTS

| EP | 1 035 722 A1 | 9/2000 |
| JP | 2000-312239 | 11/2000 |
| JP | 2009-288859 | 12/2009 |

*Primary Examiner* — Noel R Beharry
*Assistant Examiner* — Rodrick Mak
(74) *Attorney, Agent, or Firm* — Staas & Halsey LLP

(57) ABSTRACT

A communication device includes: a processor, wherein the processor adds a header corresponding to a second communication rule used by a network to uplink data which is transmitted from a terminal device to a control device to generate uplink transfer data when the communication device does not have a control element which is used for converting the communication rule of the data and corresponds to a first communication rule used by the terminal device; and the processor transmits, through the network, the generated uplink transfer data to a management device which includes the control element, that converts the communication rule of the uplink data in the uplink transfer data from the first communication rule to the second communication rule using the control element, and that transmits the uplink data to the control device.

9 Claims, 31 Drawing Sheets

(56) References Cited

U.S. PATENT DOCUMENTS

| | | | |
|---|---|---|---|
| 9,554,417 B2* | 1/2017 | Ho | H04W 12/02 |
| 2001/0034788 A1* | 10/2001 | McTernan | G06F 17/30905 709/232 |
| 2003/0145187 A1* | 7/2003 | Hudson | G06F 12/0292 711/202 |
| 2005/0025178 A1* | 2/2005 | Shirota | H04L 69/22 370/466 |
| 2005/0276283 A1* | 12/2005 | Gyselings | H04M 11/062 370/537 |
| 2006/0182143 A1* | 8/2006 | Lu | H04L 63/0227 370/469 |
| 2007/0094730 A1* | 4/2007 | Bhikkaji | H04L 63/145 726/24 |
| 2008/0244049 A1* | 10/2008 | Normark | H04L 41/0226 709/223 |
| 2009/0003296 A1* | 1/2009 | Zheng | H04W 92/045 370/338 |
| 2009/0016378 A1* | 1/2009 | Takase | H04L 12/5601 370/467 |
| 2009/0210502 A1* | 8/2009 | Ocampo | H04L 12/5895 709/206 |
| 2009/0279455 A1* | 11/2009 | Wang | H04L 12/589 370/260 |
| 2010/0135285 A1* | 6/2010 | Gomez-Ortigoza | H04L 12/58 370/352 |
| 2011/0096794 A1* | 4/2011 | Takase | H04L 12/5601 370/466 |
| 2011/0154474 A1* | 6/2011 | Siegel | G06Q 10/107 726/12 |
| 2012/0105637 A1* | 5/2012 | Yousefi | H04N 7/183 348/148 |
| 2012/0155375 A1* | 6/2012 | Zhu | H04B 7/155 370/315 |
| 2012/0254366 A1* | 10/2012 | Kusterer | H04L 43/04 709/219 |
| 2013/0170492 A1* | 7/2013 | Lu | H04L 61/6022 370/390 |

* cited by examiner

FIG. 5

DEVICE INFORMATION TABLE ～35b

| DEVICE ID | DEVICE IP (LOCAL) | MAC | CORRESPONDING MODULE ID | REGISTRATION DATE AND TIME |
|---|---|---|---|---|
| DVA2 | 192.168.10.10 | 00:00:00:0a | 1 | 2013/01/29 09:21:45 |
| DVB2 | 192.168.10.20 | 00:00:00:0b | 2 | 2013/01/29 08:10:10 |
| DVC2 | 192.168.10.12 | 00:00:00:0c | 3 | 2013/01/31 15:45:30 |

FIG. 6

MODULE INFORMATION TABLE  35c

| MODULE ID | MODULE NAME | PORT NUMBER | MEMORY REQUIREMENT | ARRANGEMENT DESTINATION | NUMBER OF TIMES PACKETS ARE TRANSMITTED AND RECEIVED |
|---|---|---|---|---|---|
| 1 | module-a | 100 | 100K | GW | 983 |
| 2 | module-b | 200 | 50K | GW | 52 |
| 3 | module-c | 300 | 10K | GW MANAGEMENT SERVER | 700 |
| 4 | module-d | 400 | 70K | GW MANAGEMENT SERVER | 0 |

FIG. 7

GW INFORMATION TABLE  ~35d

| GW-ID | GW-ID (LOCAL) | GW-IP (GLOBAL) | AVAILABLE MEMORY | PRESENCE OR ABSENCE OF MODULE DOWNLOAD FUNCTION |
|---|---|---|---|---|
| GW2 | 192.168.10.1 | 150.100.11.17 | 150K | PRESENT |

FIG. 11

STRUCTURE OF PACKET TRANSMITTED FROM GW TO DEVICE

| HEADER PORTION | | DATA PORTION |
|---|---|---|
| TRANSMISSION DESTINATION | TRANSMISSION SOURCE | COMMUNICATION PROTOCOL | |
| DEVICE IP ADDRESS (LOCAL) | GW IP ADDRESS (LOCAL) | LOCAL COMMUNICATION PROTOCOL IDENTIFIER | DEVICE DATA |

FIG. 15

DEVICE MANAGEMENT TABLE ~94b

| DEVICE ID | GW-ID | DEVICE IP (LOCAL) | CORRESPONDING MODULE ID | GW REGISTRATION DATE AND TIME |
|---|---|---|---|---|
| DVA1 | GW1 | 192.168.0.10 | 1 | 2013/01/30 10:40:20 |
| DVB1 | GW1 | 192.168.0.20 | 2 | 2013/01/31 23:00:01 |
| DVA2 | GW2 | 192.168.10.10 | 1 | 2013/01/29 09:21:45 |
| DVB2 | GW2 | 192.168.10.11 | 2 | 2013/01/29 08:10:10 |
| DVC2 | GW2 | 192.168.10.12 | 3 | 2013/01/31 15:45:30 |

FIG. 16

MODULE MANAGEMENT TABLE  94c

| MODULE ID | MODULE NAME | PORT NUMBER | MEMORY REQUIREMENT |
|---|---|---|---|
| 1 | module-a | 100 | 100K |
| 2 | module-b | 200 | 50K |
| 3 | module-c | 300 | 10K |
| 4 | module-d | 400 | 70K |

FIG. 17

GW MANAGEMENT TABLE  ~94d

| GW-ID | GW-IP (LOCAL) | GW-IP (GLOBAL) | AVAILABLE MEMORY | PRESENCE OR ABSENCE OF MODULE DOWNLOAD FUNCTION | PROVIDED COMMUNICATION MODULE ID |
|---|---|---|---|---|---|
| GW1 | 192.168.0.1 | 180.200.10.15 | 200K | ABSENT | 1 |
| GW2 | 192.168.10.1 | 150.100.11.17 | 150K | PRESENT | 1,2 |

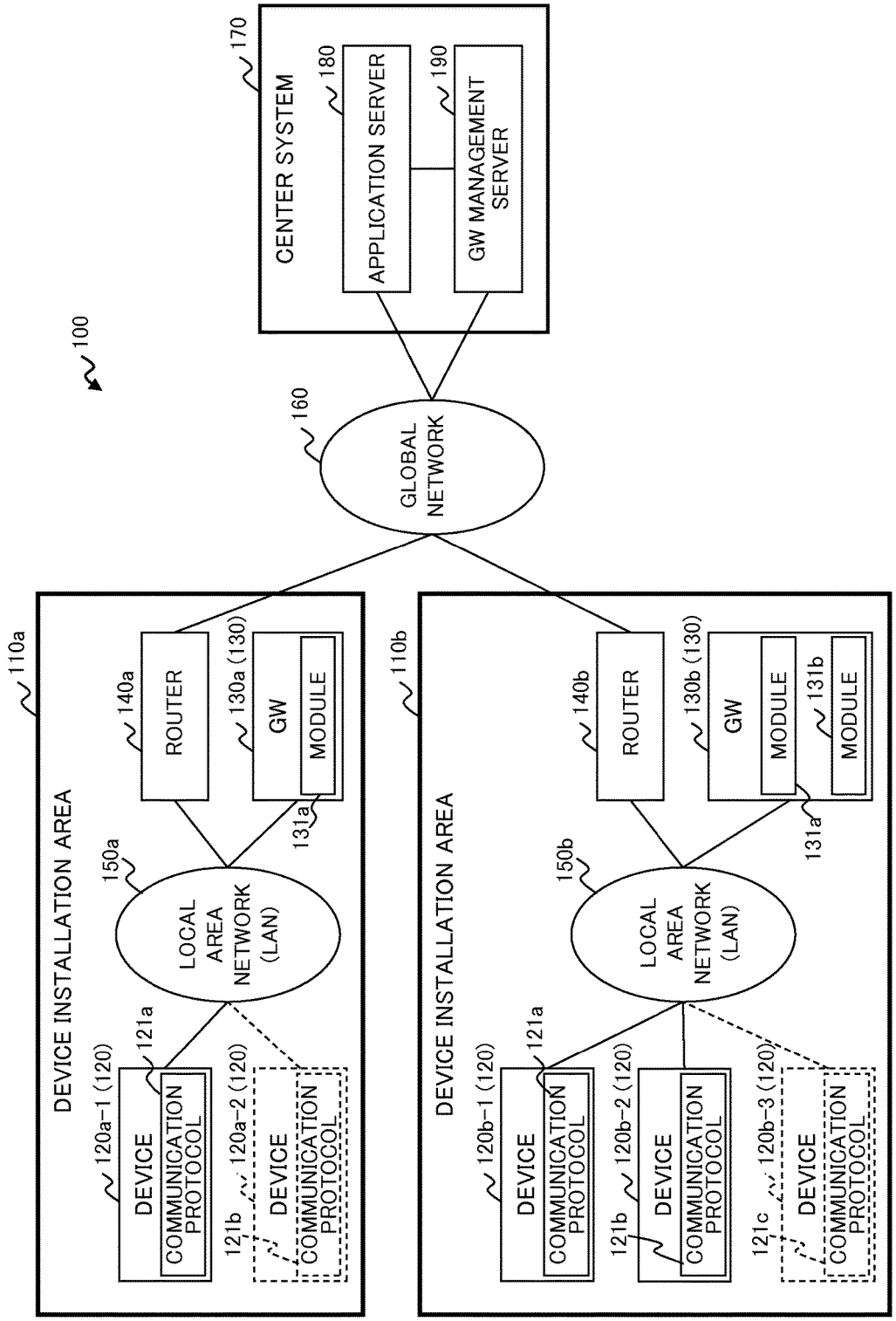

COMMUNICATION DEVICE, MANAGEMENT DEVICE, PROCESSING METHOD, AND COMPUTER-READABLE RECORDING MEDIUM HAVING PROCESSING PROGRAM STORED THEREIN

CROSS-REFERENCE TO RELATED APPLICATION

This application is based upon and claims the benefit of priority of the prior Japanese Patent Application No. 2013-097471, filed on May 7, 2013, the entire contents of which are incorporated herein by reference.

FIELD

The present invention relates to a communication device, a management device, a processing method, and a computer-readable recording medium having a processing program stored therein.

BACKGROUND

Hitherto, a communication system has been known which includes a device that is installed in a local area network (LAN), such as a home network, and a center system that monitors and controls the device in the LAN through a global network.

In the communication system, in some cases, a gateway (GW), which is a communication device for converting a communication protocol (communication rule) of packets transmitted and received between the device and the center system, is provided in the LAN.

For example, the communication protocol used by the center system for communication (a communication protocol used in the global network) is a hypertext transfer protocol (HTTP). In some cases, the communication protocol used by the device in the LAN for communication (a communication protocol used in the LAN) is determined based on the type of each device. In many cases, the communication protocol used by the device in the LAN differs from the communication protocol used by the center system.

The GW converts the communication protocol between the communication protocol of the packets transmitted and received between the device and a router in the LAN and the communication protocol used by the center system and the router in the LAN can transmit and receive packets between the device and the center system.

The GW includes a communication protocol module (hereinafter, simply referred to as a module) which performs a communication protocol conversion process. The module is a control element which is managed for each type of device (the communication protocol used by the device). The GW converts the communication protocol using the module corresponding to the device which is a packet transmission source or a packet transmission destination.

FIG. 31 is a diagram illustrating an example of the structure of a communication system 100.

As illustrated in FIG. 31, the communication system 100 includes a device installation area 110a, a device installation area 110b, and a center system 170.

The device installation area 110a is a device installation place, such as a home, and includes a device 120a-1, a GW 130a, and a router 140a. Similarly, the device installation area 110b includes devices 120b-1 and 120b-2, a GW 130b, and a router 140b. Hereinafter, when the devices 120a-1, 120b-1, and 120b-2 are not distinguished from each other, they are simply referred to as devices 120. When the GWs 130a and 130b are not distinguished from each other, they are simply referred to as GWs 130.

In the device installation area 110a, the device 120a-1 transmits and receives packets to and from the center system 170 using a communication protocol 121a.

The GW 130a includes a module 131a. The GW 130a converts the communication protocol of the packets transmitted and received between the device 120a-1 and the router 140a between the communication protocol 121a and a communication protocol (for example, an HTTP) which is used by the center system 170 in a global network 160, using the module 131a.

In the device installation area 110b, similarly, the devices 120b-1 and 120b-2 transmit and receive packets to and from the center system 170, using the communication protocols 121a and 121b, respectively. The GW 130b includes a module 131a corresponding to the communication protocol 121a of the device 120b-1 and a module 131b corresponding to the communication protocol 121b of the device 120b-2.

For example, a case in which the device 120a-1 transmits a packet which is generated in the format of the communication protocol 121a to the GW 130a will be described. The GW 130a converts the data format of the received packet into an HTTP format using the module 131a and transmits the packet to the center system 170. Then, the router 140a transmits (relays) the packet transmitted from the GW 130a to the center system 170 through the global network 160.

The center system 170 includes an application server 180 and a GW management server 190.

The GW management server 190 manages the devices 120 and the GWs 130.

The application server 180 provides the device 120 with an application service for monitoring or controlling the operation conditions of the device 120, based on the packet received from the device 120. The application server 180 generates a packet, such as commands or information, for the device 120 in an HTTP format and transmits the generated packet to the GW 130 through the global network 160.

When receiving the packet addressed to the GW 130a, the router 140a transmits (relays) the packet to the GW 130a. The GW 130a converts the data format of the received packet into a format of the communication protocol 121a using the module 131a corresponding to the device 120 (for example, the device 120a-1), which is a transmission destination, and transmits the packet to the device 120a-1 through the LAN 150a.

Patent Literature 1: Japanese Laid-open Patent Publication No. 2000-312239

Patent Literature 2: Japanese Laid-open Patent Publication No. 2009-288859

The communication protocol of the packet transmitted by the device 120 is in one-to-one correspondence with a port number in, for example, an Internet protocol (IP). Therefore, the GW 130 can detect the communication protocol for communication with the device 120 from the port number.

However, in some cases, the module which can be installed in the GW 130 is limited due to restrictions in the hardware and software of the GW 130. In this case, even when the GW 130 detects a new device 120 in the LAN 150a or 150b, a module corresponding to the new device 120 is not arranged in the GW 130 and the communication of the new device 120 is likely to be limited.

In FIG. 31, an example in which the GW 130a does not have a software (module) download function and the GW 130b has a software download function will be described.

For example, when a device 120a-2 using the communication protocol 121b is added to the device installation area 110a, the GW 130a detects the addition of the new device 120a-2, but does not have a module corresponding to the communication protocol 121b. Therefore, the communication of the new device 120a-2 is limited because the GW 130a does not have a software download function, that is, due to software restrictions.

When a device 120b-3 using a communication protocol 121c is added to the device installation area 110b and the GW 130b detects the addition of the new device 120b-3, the GW 130b attempts to download a module corresponding to the communication protocol 121c. However, in some cases, the storage capacity of a storage device which stores the module of the GW 130b is insufficient. In this case, the GW 130b does not have the module corresponding to the communication protocol 121c due to hardware restrictions and the communication of the new device 120b-3 is limited.

As such, in the communication system 100, when the GW 130 does not have the module corresponding to the communication protocol used by the device 120, the communication of the device 120 is limited.

SUMMARY

According to an aspect of the embodiment, a communication device that controls communication of data which is transmitted and received between a terminal device and a control device controlling the terminal device through a network. The communication device includes: a processor, wherein the processor determines whether the communication device has a control element which is used for converting a communication rule of the data and corresponds to a first communication rule used by the terminal device; when it is determined that the communication device does not have the control element, the processor adds a header corresponding to a second communication rule used in the network to uplink data which is transmitted from the terminal device to the control device to generate uplink transfer data; and the processor transmits, through the network, the generated uplink transfer data to a management device that includes the control element, that converts the communication rule of the uplink data in the uplink transfer data from the first communication rule to the second communication rule using the control element, and that transmits the uplink data to the control device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a device information table held by the GW illustrated in FIG. 1;

FIG. 6 is a diagram illustrating an example of a module information table held by the GW illustrated in FIG. 1;

FIG. 7 is a diagram illustrating an example of a GW information table held by the GW illustrated in FIG. 1;

FIG. 11 is a diagram illustrating an example of the structure of a packet transmitted from the GW to the device illustrated in FIG. 1;

FIG. 15 is a diagram illustrating an example of a device management table held by the GW management server illustrated in FIG. 1;

FIG. 16 is a diagram illustrating an example of a module management table held by the GW management server illustrated in FIG. 1;

FIG. 17 is a diagram illustrating an example of a GW management table held by the GW management server illustrated in FIG. 1;

FIG. 31 is a diagram illustrating an example of the structure of a communication system.

DESCRIPTION OF EMBODIMENTS

Hereinafter, an embodiment of the invention will be described with reference to the drawings.

[1] Embodiment

[1-1] For Communication System

Figure 1:
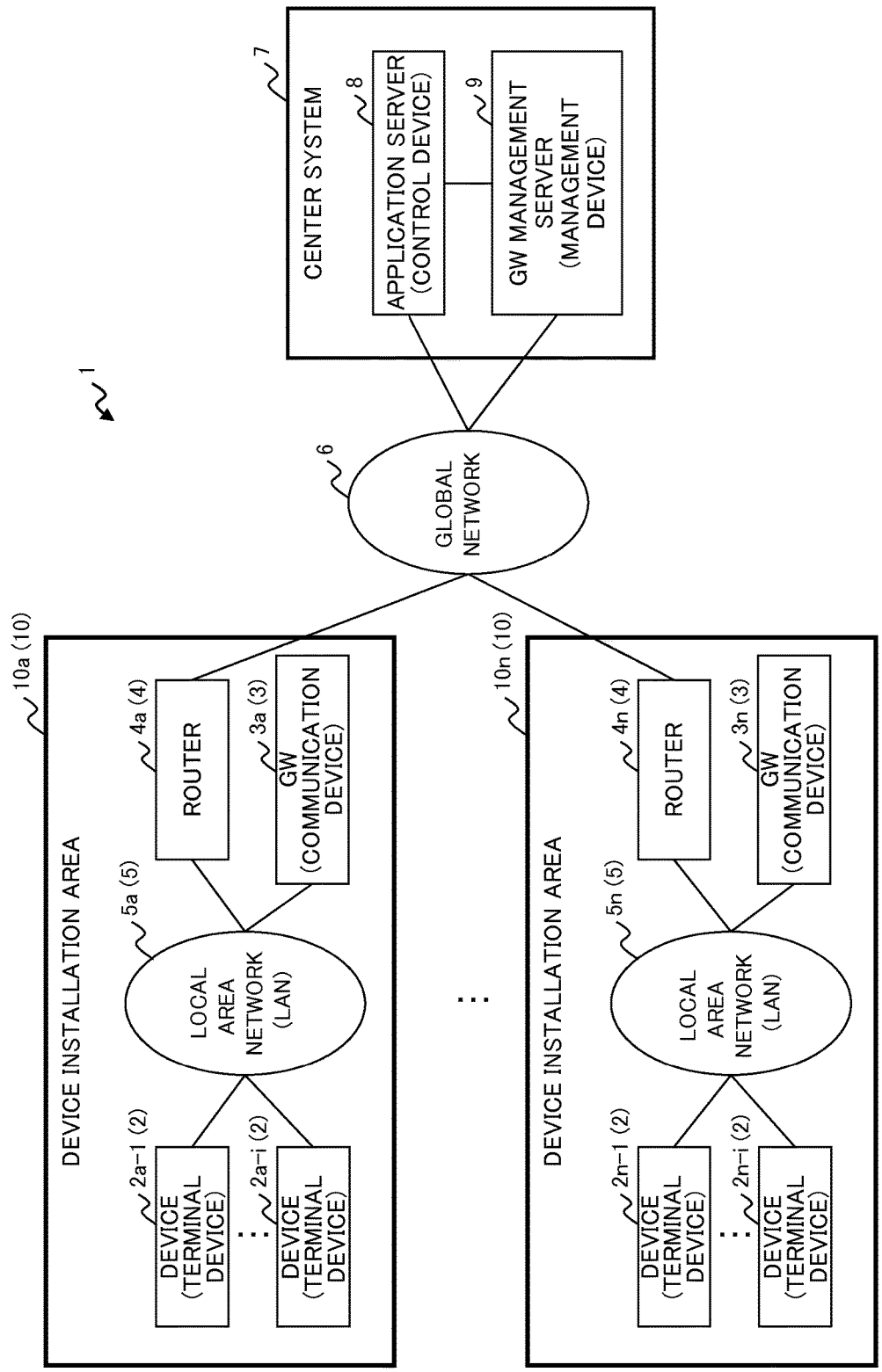
FIG. 1 is a diagram illustrating an example of the structure of a communication system according to an embodiment.

FIG. 1 is a diagram illustrating an example of the structure of a communication system 1 according to an embodiment. As illustrated in FIG. 1, the communication system 1 according to the embodiment includes a plurality of (for example, n; n is an integer equal to or greater than 1) device installation areas 10a to 10n and a center system 7. Hereinafter, when the device installation areas 10a to 10n are not distinguished from each other, they are simply referred to as device installation areas 10.

The device installation area 10 is a device installation place, such as a home, an office, or a facility. The device installation area 10a includes a plurality of (for example, i; i is an integer equal to or greater than 1) devices 2a-1 to 2a-i, a GW 3a, and a router 4a which are connected to each other through a LAN 5a. Similarly, the device installation area 10n includes a plurality of (for example, i) devices 2n-1 to 2n-i, a GW 3n, and a router 4n which are connected to each other through a LAN 5n.

In the following description, since the devices included in the device installation areas 10a to 10n have the same functions or substantially the same functions, each device included in an arbitrary device installation area 10 will be described. When the devices 2a-1 to 2n-i, the GWs 3a to 3n, the routers 4a to 4n, and the LANs 5a to 5n are not distinguished from each other, they are simply referred to as devices 2, GWs 3, routers 4, and LANs 5, respectively.

The device (terminal device) 2 transmits and receives packets (data), such as commands or information, to and from the center system 7 using a predetermined communication method. The communication method is a rule, such as agreement, procedure, and/or a data format for implementing the transmission and reception of a telegram between the device 2 and the center system 7. For example, a communication protocol is given as an example of the communication method. In the following description, the communication method is a communication protocol.

Examples of the device 2 include various types of devices with a communication function, such as home appliances, security devices including security cameras and sensors, and meters indicating the usage conditions of power in the device installation area 10. In addition, the device 2 may be an information processing device, such as a personal computer (PC) or a server, in addition to the above-mentioned various types of devices.

The device 2 sets device data as information, which is used for the monitoring and control operations of an application server 8, to a data portion of a packet to be transmitted to the center system 7. The device data may include information indicating various states of the device 2, such as a media access control (MAC) address, which is an example of information for specifying the device 2, the usage conditions of power, or the detection result (notice of a change in state) of the sensor.

The communication protocol used by the device 2 (the communication protocol used in the LAN 5) is predetermined for each device 2. Therefore, one or more types of communication protocols are used in the LAN 5 of the device installation area 10.

Examples of the communication protocol used by the device 2 include ECHONET Lite (registered trademark) and ZigBee (registered trademark). In addition, for example, a transmission control protocol (TCP)/Internet protocol (IP) in which a communication protocol has a lower level than ECHONET Lite or ZigBee may be used in the LAN 5.

The GW 3 (communication device) controls the communication of packets which are transmitted and received between the device 2 and the application server 8 that controls the device 2 through a global network (network) 6. Examples of the GW 3 include a protocol converter, such as a gateway device, and an information processing device with a communication protocol conversion function, such as a PC or a server.

The GW 3 can have a communication protocol module (module 35a; see FIG. 4), which will be described below. The GW 3 can convert the communication protocol of the packet, which is transmitted and received between the device 2 and the router 4, between the communication protocol used by the device 2 and the communication protocol used in the global network 6 using the module 35a.

An example of the communication protocol used in the global network 6 is an HTTP. In the following description, it is assumed that the communication protocol used in the global network 6 is the HTTP.

The detailed structure of the GW 3 will be described below.

The router 4 is a relay device which is connected to the LAN 5 and the global network 6 and relays the packets transmitted and received between the device 2 and the GW 3, and the center system 7. Examples of the router 4 include a broadband router which is installed in a home and various types of relay devices including software routers or hardware routers, such as a Layer 3 (L3) switch.

The center system 7 performs, for example, a process of monitoring or controlling the devices 2 provided in each device installation area 10. In addition, the center system 7 communicates with the device installation area 10 using the communication protocol used in the global network 6, such as an HTTP. The center system 7 includes the application server 8 and a GW management server 9.

The application server (control device) 8 provides application services for the monitoring or controlling the operation conditions of the device 2 to the device 2 based on the packets received from the device 2. For example, the application server 8 monitors information indicating various states of the device 2 to control power management or security management for the device 2.

The application server 8 can interpret data which is described in a data format that can communicate using the HTTP used in the global network 6, such as an extensible markup language (XML). The application server 8 generates a packet (data) including commands or information for the device 2 based on the device data transmitted from the device 2 and transmits the generated packet to the GW 3 through the global network 6.

For example, the application server 8 sets data (device data) for monitoring and controlling the device 2, such as commands or information for the device 2, to a data portion of the packet to be generated and adds a header corresponding to the HTTP to a header portion. The device data in the packet to be generated is described in, for example, an XML format.

The GW management server (management device) 9 manages the devices 2 and the GWs 3. For example, the GW management server 9 includes modules corresponding to various types of known communication protocols and can provide the modules to the GWs 3 in response to requests from the GWs 3. The GW management server 9 can convert the communication protocol of the packet transmitted and received by the device 2, instead of the GW 3.

The detailed functions of the GW management server 9 will be described below.

An information processing device, such as a server, is given as an example of the application server 8 and the GW management server 9.

[1-2] For Overall Operations

The communication system 1 (the GW 3 and the center system 7) according to this embodiment performs the following processes (1) to (4) to implement the communication between the device 2 and the application server 8.

(1) The GW 3 determines whether its own module 35*a* (see FIG. 4) corresponding to the communication protocol (first communication rule) used by the device 2 is provided.

(2) When it is determined that the module 35*a* is not provided, the GW 3 adds a header to an uplink packet (uplink data) which is transmitted from the device 2 to the application server 8 to generate an uplink transfer packet (uplink transfer data). The header corresponds to the communication protocol (a second communication rule; for example, an HTTP) used in the global network 6.

(3) The GW 3 transmits the generated uplink transfer packet to the GW management server 9 through the global network 6.

(4) The GW management server 9 has the module 35*a* corresponding to the communication protocol used by the device 2. The GW management server 9 converts the communication protocol of the uplink packet in the uplink transfer packet into the communication protocol (second communication rule) used in the global network 6 using the module 35*a* and transmits the converted uplink packet to the application server 8.

When it is determined in the process (1) that the GW 3 has the module 35*a*, the GW 3 converts the communication protocol of the uplink packet into the communication protocol (second communication rule) used in the global network 6 using the module 35*a*. Then, the GW 3 transmits the converted uplink packet to the application server 8.

According to the above-mentioned processes (1) to (4), even when the resources of the GW 3 are limited, the GW management server 9 of the center system 7 can process a newly added communication protocol. Accordingly, when the existing GW 3 collects and controls data of the latest device 2, a new GW 3 is introduced in the related art. However, according to the communication system 1 of this embodiment, it is possible to add a new service using the existing GW 3 with limited resources.

As described above, according to the communication system 1 of this embodiment, even when the GW 3 does not have the module 35*a* corresponding to the communication protocol used by the device 2, the device 2 can perform communication.

As such, in the communication system 1 in which the application server 8 monitors and controls the device 2 in the LAN 5 which is installed in, for example, a home using service applications, the modules 35*a* (94*a*) that correspond to each type of device 2 and enable communication with the device 2 which will be monitored and controlled by the application server 8 are provided in a plurality of places. For example, the module 35*a* (94*a*) (communication protocol software) is provided in the GW 3 which is arranged in the LAN 5 or the center system 7 (GW management server 9) which can communicate with the GW 3.

Next, the GW 3 and the GW management server 9 will be described in detail.

[1-3] Hardware Configuration of GW and GW Management Server

Figure 2:
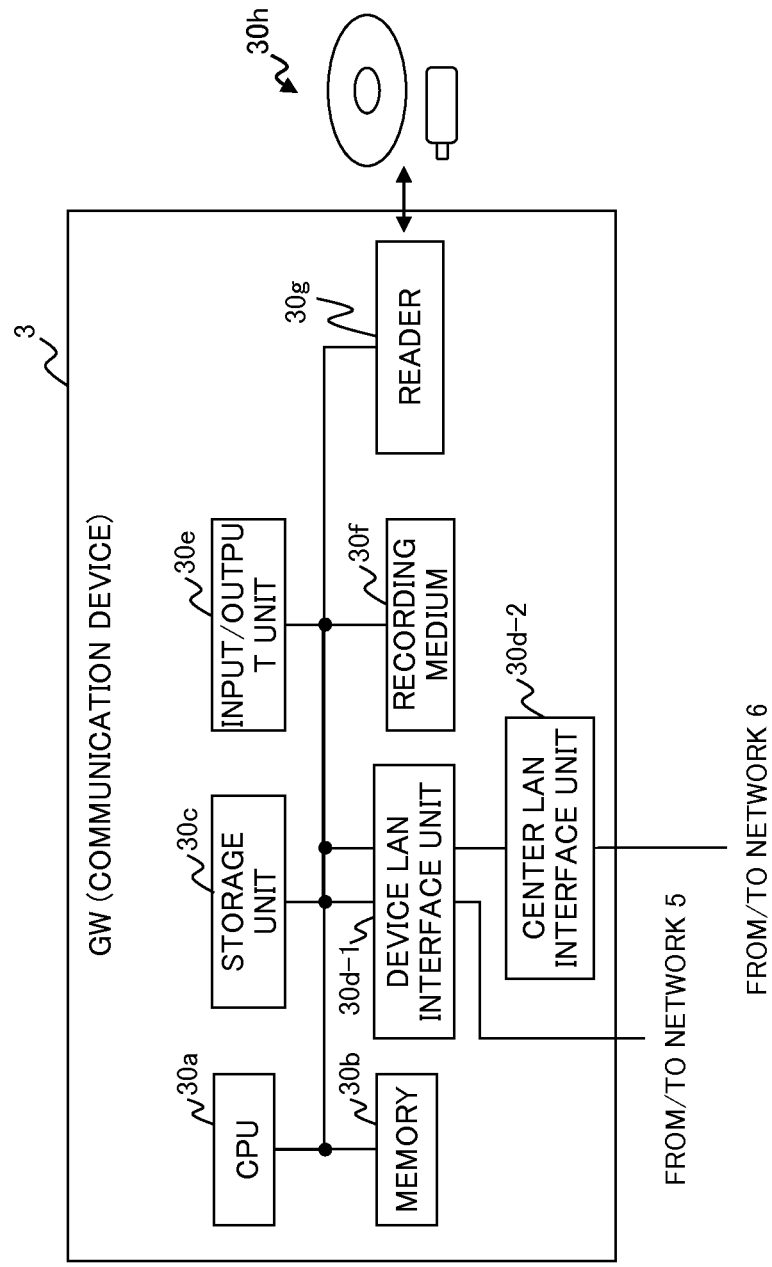
FIG. 2 is a diagram illustrating an example of the hardware configuration of a GW illustrated in FIG. 1.

Next, the hardware configuration of the GW 3 and the GW management server 9 will be described with reference to FIGS. 2 and 3. FIG. 2 is a diagram illustrating the hardware configuration of the GW 3 illustrated in FIG. 1 and FIG. 3 is a diagram illustrating the hardware configuration of the GW management server 9 illustrated in FIG. 1.

Figure 3:
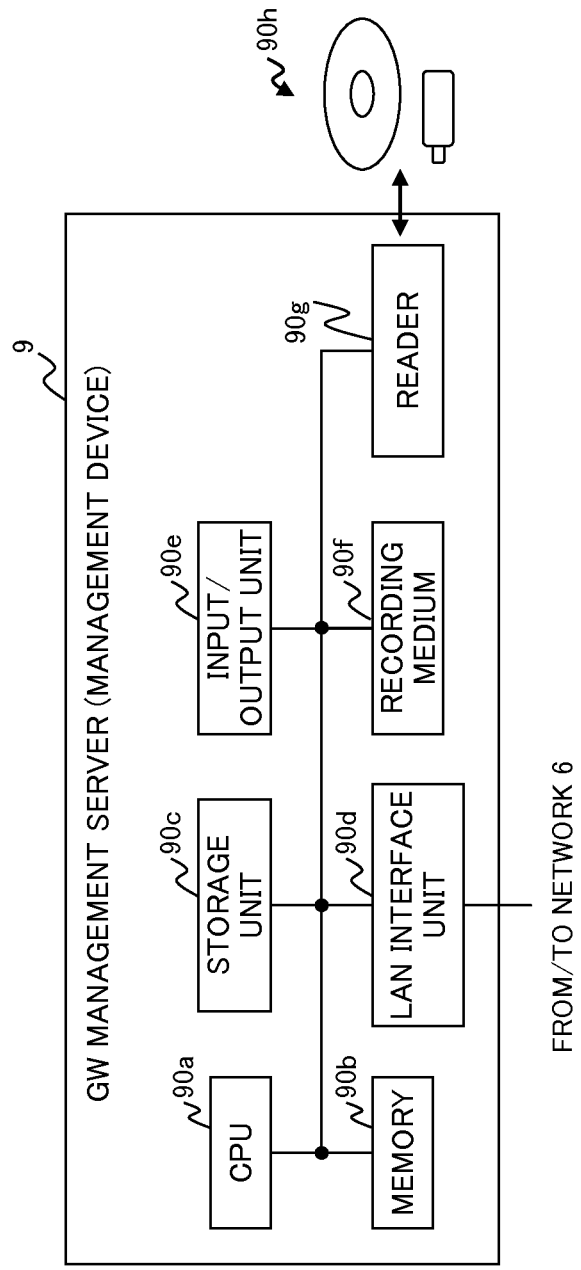
FIG. 3 is a diagram illustrating an example of the hardware configuration of a GW management server illustrated in FIG. 1.

As illustrated in FIGS. 2 and 3, the GW 3 and the GW management server 9 include CPUs 30*a* and 90*a*, memories 30*b* and 90*b*, storage units 30*c* and 90*c*, and input/output units 30*e* and 90*e*, respectively. As illustrated in FIGS. 2 and 3, the GW 3 and the GW management server 9 further include recording media 30*f* and 90*f* and readers 30*g* and 90*g*, respectively. As illustrated in FIG. 2, the GW 3 further includes a device LAN interface unit 30*d*-1 and a center LAN interface unit 30*d*-2. As illustrated in FIG. 3, the GW management server 9 further includes a LAN interface unit 90*d*.

The CPUs 30*a* and 90*a* are processing units (processors) which are connected to the devices from the corresponding memories 30*b* and 90*b* to the corresponding readers 30*g* and 90*g*, respectively, and perform various control and calculation operations. The CPUs 30*a* and 90*a* execute programs stored in the memories 30*b* and 90*b*, the recording media 30*f* and 90*f*, or read only memories (ROMs) (not illustrated) to implement various functions of the GW 3 and the GW management server 9, respectively. The processor is not limited to the CPUs 30*a* and 90*a*, but may be an integrated circuit, such as an application specific integrated circuit (ASIC) or a field programmable gate array (FPGA), or an electronic circuit, such as a micro processing unit (MPU).

The memories 30*b* and 90*b* are storage devices which temporarily store various kinds of data or programs. When the CPUs 30*a* and 90*a* execute programs, the memories 30*b* and 90*b* temporarily store data or the programs, develop the data or the programs, and use the developed data or programs. For example, a volatile memory, such as a random access memory (RAM), is used as the memories 30*b* and 90*b*.

The storage units 30*c* and 90*c* are hardware which stores, for example, various kinds of data or programs. Various types of devices including a magnetic disk device, such as a hard disk drive (HDD), a semiconductor drive device, such as a solid state drive (SSD), and a non-volatile memory, such as a flash memory, are given as examples of the storage units 30c and 90c.

The device LAN interface unit 30d-1 controls the wireless or wired connection and communication between the GW 3 and the device 2 (LAN 5). The center LAN interface unit 30d-2 controls the wireless or wired connection and communication between the GW 3 and the center system 7, that is, between the GW 3 and the router 4 (LAN 5). The LAN interface unit 90d controls the wireless or wired connection and communication between the GW management server 9 and the application server 8 and between the GW management server 9 and the router 4 (global network 6).

A network controller, such as a LAN card, is given as an example of the device LAN interface unit 30d-1, the center LAN interface unit 30d-2, and the LAN interface unit 90d.

The input/output units 30e and 90e each include at least one of an input device, such as a mouse or a keyboard, and an output device, such as a display or a printer. The input/output units 30e and 90e receive operation commands input by the operators (administrator) of the GW 3 and the GW management server 9 using the input device, and display (output) the processing results of the GW 3 and the GW management server 9, such as the monitoring results, on the output device.

The recording media 30f and 90f are storage devices, such as flash memories or ROMs, and record various kinds of data or programs. The readers 30g and 90g are devices which read the data or programs recorded on computer-readable recording media 30h and 90h, such as optical disks or universal serial bus (USB) memories.

At least one of the recording media 30f and 30h may store a processing program for implementing the functions of the GW 3 according to this embodiment and at least one of the recording media 90f and 90h may store a control program for implementing the functions of the GW management server 9. For example, the CPU 30a (90a) develops the control program which is input from the recording medium 30f (90f) or the control program which is input from the recording medium 30h (90h) through the reader 30g (90g) in the storage device, such as the memory 30b (90b), and execute the developed program. A computer serving as the GW 3 and a computer serving as the GW management server 9 implement the functions of the GW 3 and the GW management server 9 according to this embodiment using the CPUs 10a and 10b, respectively.

The above-mentioned hardware components are connected to a bus such that they can communicate with each other.

The LAN 5 may be a wired line, such as a cable, or a wireless line. Examples of the cable, which is a wired line, include cables, such as a LAN cable and an InfiniBand (registered trademark), and serial cables, such as fiber cables including a Fibre channel. Examples of the wireless line include a wireless LAN and Bluetooth (registered trademark).

A wide area communication network (wide area network), such as Internet, is given as an example of the global network 6. A dedicated line may be used as the global network 6.

The hardware configuration of the GW 3 and the GW management server 9 is an illustrative example. Therefore, the hardware configuration may be appropriately changed. For example, the number of hardware components in each of the GW 3 and the GW management server 9 may increase or decrease, the hardware component may be divided, and the GW 3 and the GW management server 9 may be arbitrarily combined with each other.

The hardware configuration of the GW management server 9 may be shared by the entire application server 8 or the entire center system 7 and the application server 8 may have the same hardware configuration as the GW management server 9.

[1-4] Description of GW

Figure 4:
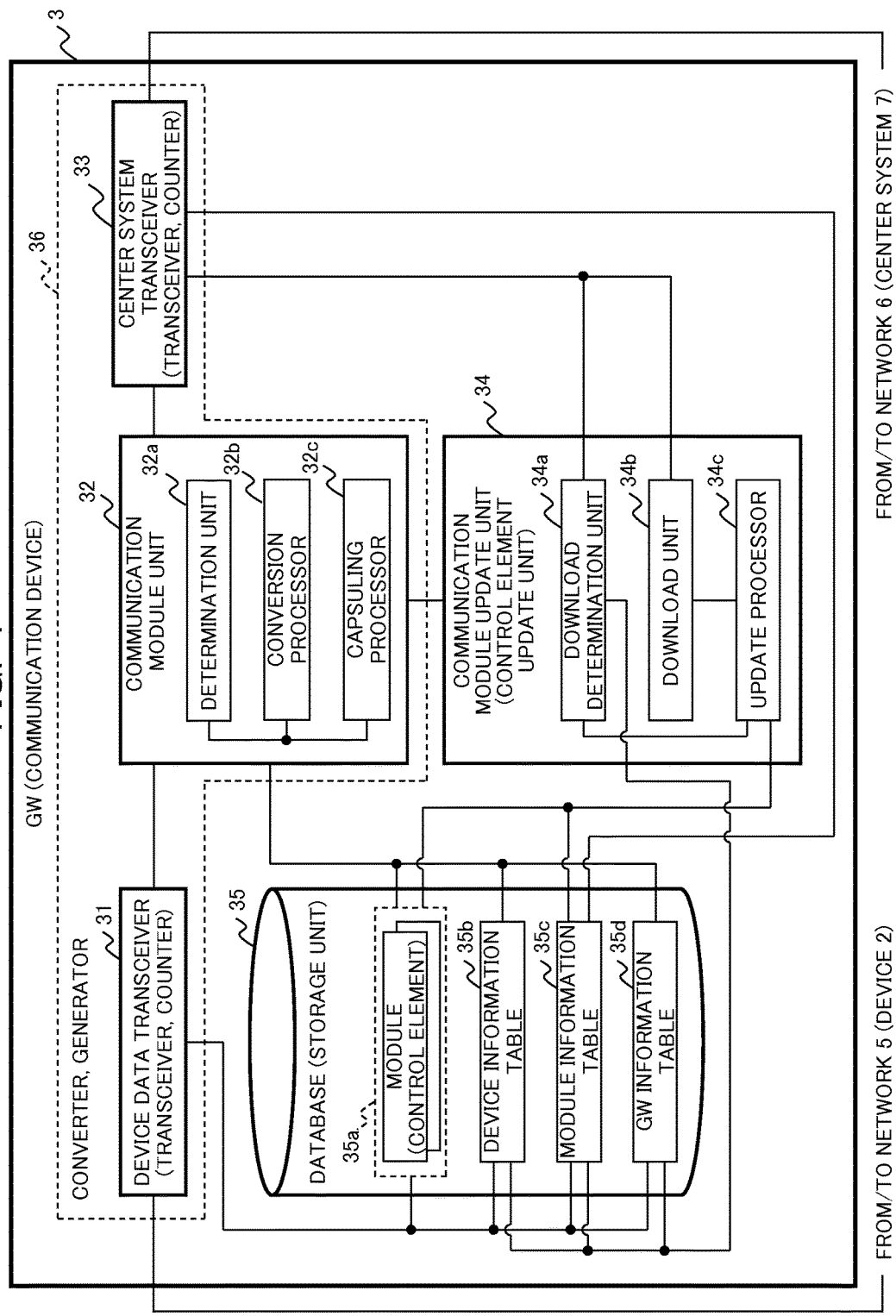
FIG. 4 is a diagram illustrating an example of the structure of the GW illustrated in FIG. 1.

Next, the GW 3 will be described in detail with reference to FIGS. 4 to 13. FIG. 4 is a diagram illustrating an example of the structure of the GW 3 illustrated in FIG. 1. FIGS. 5 to 7 are diagrams illustrating examples of a device information table 35b, a module information table 35c, and a GW information table 35d held by the GW illustrated in FIG. 1, respectively.

As illustrated in FIG. 4, the GW 3 includes a device data transceiver 31, a communication module unit 32, a center system transceiver 33, a communication module update unit 34, and a database 35.

The database (storage unit) 35 can store at least one module 35a among one or more modules (control elements) 35a corresponding to the types of protocols used by the devices 2 which are installed in the device installation area 10. The module 35a stored in the database 35 is used in a packet communication protocol conversion process of the communication module unit 32. As described above, the GW 3 does not have all modules 35a corresponding to the communication protocols used by the devices 2 in the device installation area 10 due to, for example, restrictions in resources. For example, it is considered that the GW 3 does not have the module 35a when a new GW 3 is provided or when the GW 3 is initialized.

The module 35a may be a program with a function which converts the packet communication protocol between the communication protocol used by the device 2 and the communication protocol used by the application server 8 or it may be a parameter corresponding to the communication protocol.

The database 35 further stores a device information table 35b, a module information table 35c, and a GW information table 35d. The database 35 is implemented by, for example, the memory 30b or the storage unit 30c illustrated in FIG. 2.

As illustrated in FIG. 5, the device information table 35b is used to manage information of the device 2 connected to the GW 3. Specifically, the device information table 35b includes, as items, the device ID of the device 2, the local IP address of the device 2 in the LAN 5, and the MAC address of the device 2. The device information table 35b further includes the module ID of the module 35a corresponding to the communication protocol used by the device 2 and registration date and time indicating the date and time when the information of the device 2 is registered in the device information table 35b.

For example, the device information table 35b includes information in which a local device IP address "192.168.10.10", a MAC address "00:00:00:0a", a corresponding module ID "1", and a registration date and time "2013/01/29 09:21:45" are associated with a device ID "DVA2".

The device ID and the corresponding module ID may be unique information which can specify the device 2 and the module 35a. For example, the device ID is generated from the MAC address of the device 2 by the GW 3.

As illustrated in FIG. 6, the module information table 35c is used to manage the information and arrangement destinations of all modules 35*a* corresponding to the communication protocol which enables communication in the communication system 1. Specifically, the module information table 35*c* includes, as items, the module ID of the module 35*a*, a module name, the port number of the module 35*a*, and a memory requirement indicating a memory size used in the operation of the module 35*a*. The module information table 35*c* further includes the arrangement (deployment) destination of the module 35*a* and the number of times packets are transmitted and received by the module 35*a*.

For example, the module information table 35*c* includes information in which a module name "module-a", a port number "100", a memory requirement "100K", an arrangement destination "GW", and the number of times packets are transmitted and received "983" are associated with a module ID "1".

As illustrated in FIG. 7, the GW information table 35*d* is used to manage the information of the GW 3. Specifically, the GW information table 35*d* includes, as items, a GW-ID, which is an ID for identifying the GW 3, and the IP address of an (local) interface of the LAN 5 through which the GW 3 communicates with the device 2. The GW information table 35*d* further includes the IP address of an (global) interface of the global network 6 through which the GW 3 communicates with the center system 7 and the total amount of memory which can be used by the module in the GW 3. The GW information table 35*d* further includes the presence or absence of a module download function indicating whether the GW 3 has the module download function.

For example, the GW information table 35*d* includes information in which a local GW-IP address "192.168.10.1", a global GW-IP address "150.100.11.17", an available memory "150K", and the presence or absence of a module download function "present" are associated with a GW-ID "GW2".

The available memory can be the total free space in the storage area of the database 35 for storing the module 35*a*.

When the GW 3 is installed in the device installation area 10, the GW information table 35*d* is manually registered by, for example, the administrator through the input/output unit 30*e* or through the LAN 5 or the global network 6. The GW 3 may acquire the global GW-IP address in the GW information table 35*d* from the router 4 using Universal Plug and Play (UPnP) and register the global GW-IP address.

The device data transceiver 31 communicates with the device 2 installed in the device installation area 10 and transmits and receives packets to and from the device 2.

The center system transceiver 33 communicates with the center system 7 and exchanges packets with the center system 7 through the router 4.

Hereinafter, the device data transceiver 31 and the center system transceiver 33 are referred to as transceivers 31 and 33, respectively.

The process of the transceivers 31 and 33 transmitting the packets received from the device 2, the application server 8, or the GW management server 9 will be described in detail in the description of the communication module unit 32.

For example, when the device 2 is connected to the LAN 5 (GW 3) or the information of the device 2 is changed, in some cases, the transceiver 31 receives a packet including device data to which manufacturer information is set from the device 2. In this case, the transceiver 31 registers the information of the device 2 in the device information table 35*b* based on the received packet.

Figure 8:
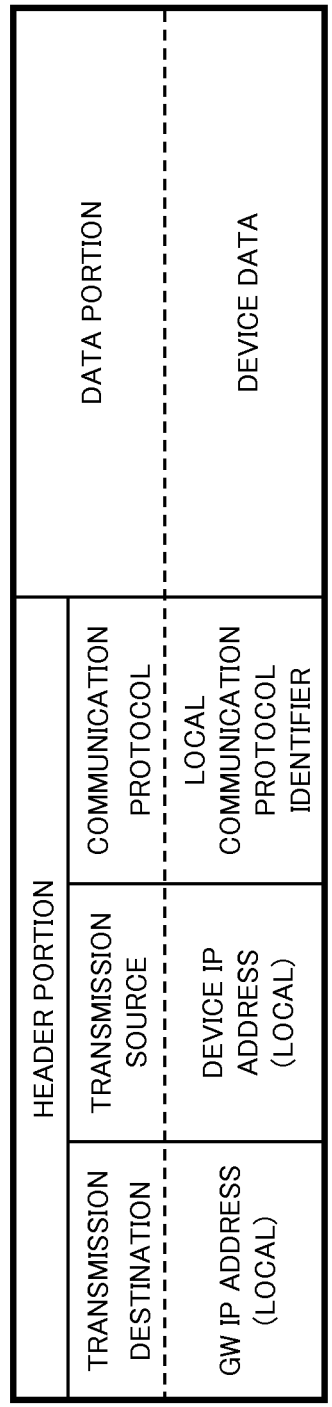
FIG. 8 is a diagram illustrating an example of the structure of a packet transmitted from a device to the GW illustrated in FIG. 1.

FIG. 8 is a diagram illustrating an example of the structure of a packet transmitted from the device 2 to the GW 3 illustrated in FIG. 1.

As illustrated in FIG. 8, a header portion of the packet transmitted from the device 2 to the GW 3 includes the local IP address of the GW 3 as a transmission destination, the local IP address of the device 2 as a transmission source, and a local communication protocol identifier as a communication protocol. In addition, device data is included in a data portion of the packet.

An example of the communication protocol identifier is various kinds of information capable of specifying the communication protocol, such as the port number of the communication protocol (first communication rule) used by the device 2. In the following description, it is assumed that the port number is used as the communication protocol identifier.

The transceiver 31 acquires the IP address of the transmission source in the header portion and the MAC address of the device 2 included in the device data of the data portion in the packet received from the device 2. Then, the transceiver 31 registers the acquired device IP address and MAC address in the device information table 35*b* so as to be associated with the device ID which is generated based on the MAC address.

The transceiver 31 specifies the module 35*a* corresponding to the port number based on the communication protocol identifier (port number) in the packet received from the device 2. Then, the transceivers 31 and 33 acquire the module ID of the specified module 35*a* from the module information table 35*c* and register the module ID in the device information table 35*b*.

Various known methods can be used to specify one of the port number and the module 35*a* from the other of the port number and the module 35*a* and the detailed description thereof will not be repeated.

When the device information table 35*b* is updated (generated) by the transceivers 31 and 33, the transceiver 33 notifies the GW management server 9 of the updated information of the device 2 (the GW-ID, the device ID, the device IP address, the corresponding module ID, and the registration date and time).

The transceiver 31 can count the number of times packets are transmitted and received to and from the device 2 for a predetermined period and the transceiver 33 can count the number of times packets are transmitted and received to and from the center system 7 (router 4) for a predetermined period. In this case, the transceivers 31 and 33 perform counting operation for each type of communication protocol used by the device 2, for example, for each port number.

When the counting operation is performed for a predetermined period, the transceivers 31 and 33 set the number of times packets are transmitted and received for each counted port number to the corresponding number of times packets are transmitted and received in the module information table 35*c*. The communication module update unit 34, which will be described below, resets the count result and the transceivers 31 and 33 count the number of times packets are transmitted and received for the next predetermined period.

The predetermined period can be, for example, a day or a week.

As such, each of the transceivers 31 and 33 is an example of a counter which counts the amount of communication of the packets transmitted and received for a predetermined period for each type of communication protocol used by the device 2.

Each of the transceivers 31 and 33 is implemented by the device LAN interface unit 30d-1, the center LAN interface unit 30d-2, and a processor, such as the CPU 30a illustrated in FIG. 2.

The communication module unit 32 interprets the communication protocol of the device 2 and controls the communication of the packets transmitted and received between the device 2 and the center system 7 (LAN 5). For example, the communication module unit 32 includes a determination unit 32a, a conversion processor 32b, and a capsuling processor 32c.

Next, the processes of the determination unit 32a, the conversion processor 32b, and the capsuling processor 32c will be described.

When receiving an uplink packet transmitted from the device 2 to the application server 8, the transceiver 31 transmits the uplink packet to the determination unit 32a.

When receiving the uplink packet from the transceiver 31, the determination unit 32a determines whether the GW 3 has the module 35a corresponding to the communication protocol used by the device 2.

Specifically, when receiving the uplink packet transmitted from the device 2 from the transceiver 31, the determination unit 32a determines whether the arrangement destination of the module 35a corresponding to the port number of the uplink packet received from the device 2 is the GW 3, with reference to the module information table 35c. Then, the determination unit 32a operates one of the conversion processor 32b and the capsuling processor 32c based on the determination result.

First, the process of the conversion processor 32b will be described.

The conversion processor 32b performs a process of converting the packet communication protocol using the module 35a which processes data of each communication protocol.

Specifically, when the determination unit 32a determines that the GW 3 has the module 35a corresponding to the communication protocol of the received uplink packet, the conversion processor 32b converts the communication protocol of the uplink packet using the module 35a.

The communication protocol conversion process includes a process of converting the data format of the data portion in the packet into a data format based on the communication protocol.

Figure 9:
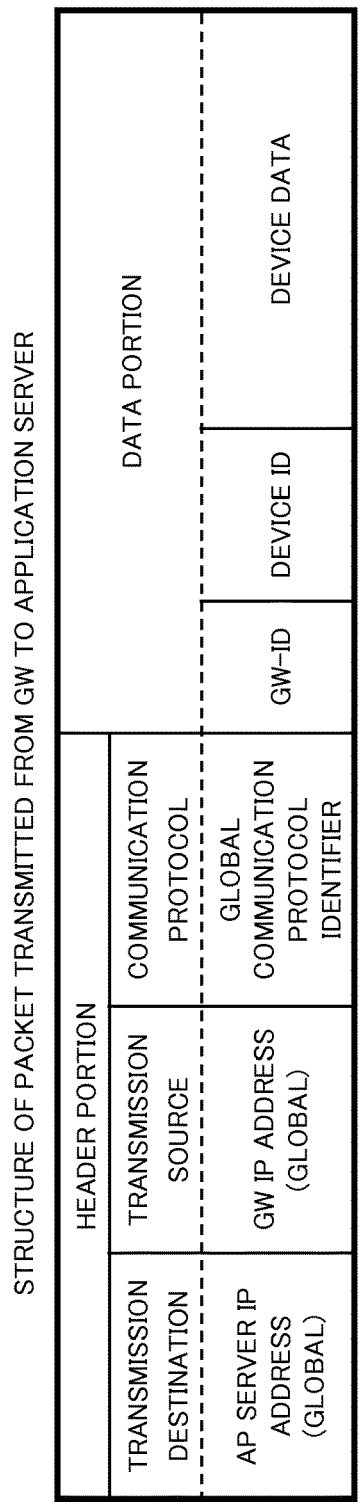
FIG. 9 is a diagram illustrating an example of the structure of a packet transmitted from the GW to an application server illustrated in FIG. 1.

FIG. 9 is a diagram illustrating an example of the structure of the packet transmitted from the GW 3 to the application server 8 illustrated in FIG. 1.

As illustrated in FIG. 9, a header portion of the packet transmitted from the GW 3 to the application server 8 includes the global IP address of the application server 8 as a transmission destination, the global IP address of the GW 3 as a transmission source, and a global communication protocol identifier as a communication protocol. A data portion of the packet includes the GW-ID of the GW 3, the device ID of the device 2, and device data.

An example of the global communication protocol identifier is the port number of the communication protocol (second communication rule) which is used by the GW 3 and the application server 8 (which is used in the global network 6).

In the conversion process, the conversion processor 32b converts the data format of the data portion in the packet illustrated in FIG. 8 from the data format used by the device 2 to the data format of the packet illustrated in FIG. 9 which is used in the global network 6, based on the GW information table 35d. Specifically, the conversion processor 32b extracts the device data in the data portion of the packet illustrated in FIG. 8, interprets the device data using the module 35a, and converts (translate) the data format of the device data into a data format, such as XML, which can be interpreted by the application server 8. In addition, the conversion processor 32b gives the GW-ID of the GW 3 and the device ID to the interpreted device data to generate a new data portion and transmits the generated data portion to the transceiver 33.

The transceiver 33 adds a header portion to the new data portion received from the conversion processor 32b to generate an uplink packet and transmits the uplink packet to the application server 8 through the router 4 and the global network 6. For example, the transceiver 33 sets, as the header portion of the uplink packet, the global IP address of the application server 8, the global IP address of the GW 3, and the port number of the HTTP to the transmission destination, the transmission source, and the communication protocol, respectively.

A downlink packet which is transmitted from the application server 8 to the device 2 is received by the transceiver 33 through the global network 6 and the router 4. When receiving the downlink packet from the application server 8, the transceiver 33 transmits the downlink packet to the conversion processor 32b.

Figure 10:
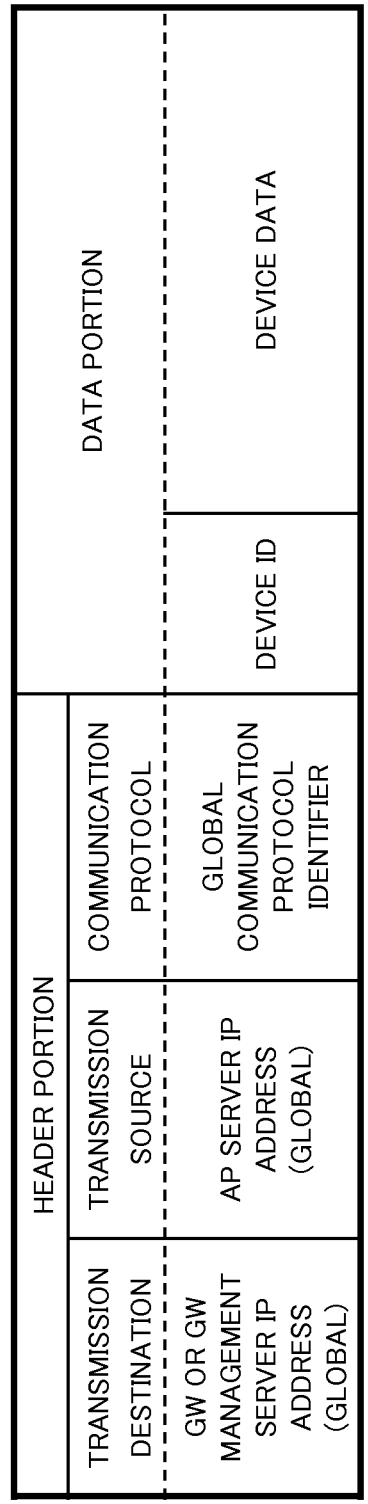
FIG. 10 is a diagram illustrating an example of the structure of a packet transmitted from the application server to the GW or the GW management server illustrated in FIG. 1.

FIG. 10 is a diagram illustrating an example of the structure of the packet transmitted from the application server 8 to the GW 3 or the GW management server 9 illustrated in FIG. 1. FIG. 11 is a diagram illustrating an example of the structure of the packet transmitted from the GW 3 to the device 2 illustrated in FIG. 1.

As illustrated in FIG. 10, a header portion of the packet transmitted from the application server 8 to the GW 3 includes the global IP address of the GW 3 as the transmission destination, the global IP address of the GW 3 as the transmission source, and a global communication protocol identifier as the communication protocol. A data portion of the packet includes device data. In FIG. 10, a device ID in the data portion is the device ID of the device 2 controlled by the application server 8. In FIG. 10, the port number of the communication protocol (second communication rule) which is used by the application server 8 and the GW 3 (which is used in the global network 6) is given as an example of the global communication protocol identifier in the header portion.

The data structure of the packet illustrated in FIG. 11 is the same or substantially the same as that of the packet illustrated in FIG. 8. In FIG. 11, the port number of the communication protocol (first communication rule) which is used by the device 2 (which is used in the LAN 5) is given as an example of the local communication protocol identifier in the header portion.

In FIGS. 10 and 11, the device data in the data portion may include information which is used by the application server 8 to perform monitoring and control, such as an instruction to control the power of the device and a request to transmit the detection result (a change in state) of the sensor.

In the conversion process, the conversion processor 32b converts the data format of the packet illustrated in FIG. 10 into the data format of the packet illustrated in FIG. 11, based on the device information table 35b.

Specifically, the conversion processor 32b converts (translates) the data format of the data portion (device data; data for monitoring or controlling the device 2) in the received downlink packet from an XML format to a data format which can be interpreted by the device 2 to generate a new data portion, based on the interpretation result of the local communication protocol used by the device 2. The downlink packet conversion process of the conversion processor 32*b* is the same as (reverse to) the uplink packet conversion process.

The conversion processor 32*b* transmits the generated data portion to the transceiver 31.

The transceiver 31 adds a header portion to the new data portion received from the conversion processor 32*b* to generate a downlink packet and transmits the downlink packet to the device 2 through the LAN 5.

For example, the transceiver 31 acquires the local IP address of the device 2 corresponding to the device ID and the corresponding module ID from the device information table 35*b* and acquires the port number corresponding to the module ID from the module information table 35*c*.

Then, the transceiver 31 sets, as the header portion of the downlink packet, the local IP address of the device 2, the local IP address of the GW 3, and the port number of the communication protocol used by the device 2 to the transmission destination, the transmission source, and the communication protocol, respectively, using the acquired information.

Therefore, the conversion processor 32*b* and the transceivers 31 and 33 function as a converter 36.

That is, when the determination unit 32*a* determines that the GW 3 has the module 35*a* corresponding to the device 2, the converter 36 converts the communication protocol of the uplink packet from the communication protocol used by the device 2 to the communication protocol used in the global network 6, using the module 35*a*.

In addition, the converter 36 converts the communication protocol of the downlink packet received from the application server 8 into the communication protocol used by the device 2, using the module 35*a* corresponding to the communication protocol used by the device 2.

The conversion processor 32*b* (CPU 30*a*) can implement the communication protocol conversion process by calling (acquiring) the module 35*a* (software) from the database 35 and executing (starting) the called module 35*a*.

The conversion processor 32*b* may be a packet processing engine which is implemented by an integrated circuit, such as ASIC or FPGA. In this case, the integrated circuit serving as the conversion processor 32*b* executes the module 35*a* to implement the communication protocol conversion process. In this case, the CPU 30*a* may perform at least some of various calculation processes in the conversion process.

Next, the process of the capsuling processor 32*c* will be described.

The capsuling processor 32*c* performs an uplink packet capsuling process.

Figure 12:
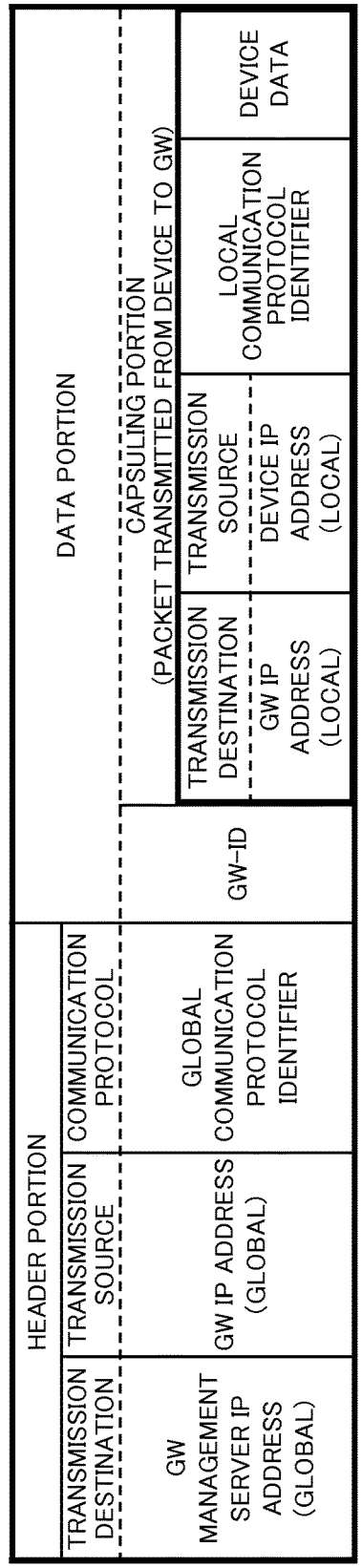
FIG. 12 is a diagram illustrating an example of the structure of a packet transmitted from the GW to the GW management server illustrated in FIG. 1.

FIG. 12 is a diagram illustrating an example of the structure of the packet transmitted from the GW 3 to the GW management server 9 illustrated in FIG. 1.

As illustrated in FIG. 12, a header portion of the packet transmitted from the GW 3 to the GW management server 9 includes the global IP address of the GW management server 9 as a transmission destination, the global IP address of the GW 3 as a transmission source, and a global communication protocol identifier as a communication protocol. In addition, a data portion includes the GW-ID of the GW 3 and a capsuling portion including the packet illustrated in FIG. 8.

In FIG. 12, the port number of the communication protocol (second communication rule) which is used by the GW 3 and the GW management server 9 (which is used in the global network 6) is given as an example of the global communication protocol identifier in the header portion.

When the determination unit 32*a* determines that the GW 3 has the module 35*a* corresponding to the communication protocol of the received uplink packet, the capsuling processor 32*c* adds the GW-ID of the host GW 3 to the received uplink packet to generate a new data portion. Then, the capsuling processor 32*c* transmits the generated data portion to the transceiver 33.

Specifically, the capsuling processor 32*c* performs a capsuling process of adding the GW-ID to the head of the packet illustrated in FIG. 8 to generate a data portion, based on the GW information table 35*d*.

The transceiver 33 adds a header portion to the data portion generated by the capsuling processor 32*c* to generate an uplink transfer packet and transmits the uplink transfer packet to the GW management server 9 through the router 4 and the global network 6.

Specifically, the transceiver 33 adds, to the received data portion, a header portion corresponding to the communication protocol (second communication rule; HTTP) which can transmit and receive data to and from the GW management server 9 through the global network 6 to generate an uplink transfer packet (see FIG. 12).

The transceiver 33 receives the downlink packet (downlink transfer packet) which is transmitted from the GW management server 9 to the device 2 through the global network 6 and the router 4.

As described above, the GW management server 9 can convert the packet communication protocol, similarly to the GW 3.

Specifically, the GW management server 9, which will be described below, has all modules 94*a* corresponding to the communication protocols used by the communication system 1 and includes a pseudo GW communication module unit 92 which performs the same process as the communication module unit 32 of the GW 3 (see FIG. 14). The GW management server 9 performs the communication protocol conversion process for packet which does not correspond to the module 35*a* of the GW 3, instead of the GW 3.

For example, the GW management server 9 extracts the uplink packet from the uplink transfer packet which is transmitted from the GW 3 to the GW management server 9. The GW management server 9 converts the communication protocol of the extracted uplink packet into the HTTP used by the application server 8 using the corresponding module 94*a* and transmits the converted uplink packet to the application server 8.

The GW management server 9 converts the communication protocol of a response packet (downlink packet) to the uplink packet transmitted by the GW management server 9 which is transmitted from the application server 8 into the communication protocol (first communication rule) used by the device 2. Then, the GW management server 9 performs the capsuling process (which adds a header portion corresponding to the second communication rule) for the converted downlink packet to generate a downlink transfer packet and transmits the downlink transfer packet to the GW 3.

Returning to FIG. 4, when receiving the downlink transfer packet from the GW management server 9, the transceiver 33 removes the header of the downlink transfer packet to extract the downlink packet.

Figure 13:
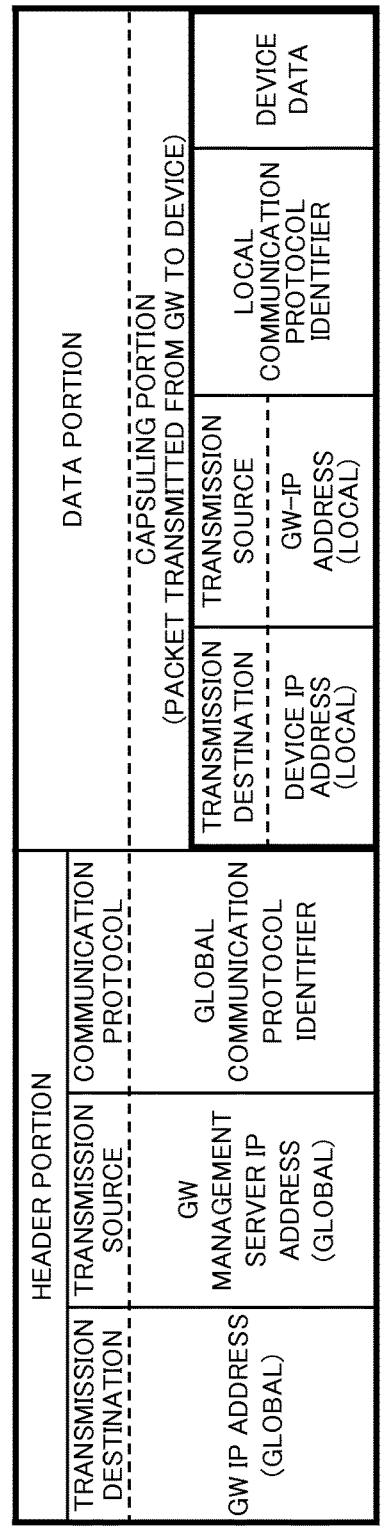
FIG. 13 is a diagram illustrating an example of the structure of a packet transmitted from the GW management server to the GW illustrated in FIG. 1.

FIG. 13 is a diagram illustrating an example of the structure of the packet transmitted from the GW management server 9 to the GW 3 illustrated in FIG. 1.

The data structure of the packet illustrated in FIG. 13 is the same or substantially the same as that of the packet illustrated in FIG. 12 except that the GW-ID is not included in the data portion.

A header portion illustrated in FIG. 13 differs from the header portion illustrated in FIG. 12 in that the IP addresses of the transmission source and the transmission destination are reversed. A data portion (capsuling portion) illustrated in FIG. 13 includes a packet (downlink packet) having the same data structure or substantially the same data structure as the packet illustrated in FIG. 11.

The port number of the communication protocol (second communication rule) which is used by the GW management server 9 and the GW 3 (which is used in the global network 6) is given as an example of the global communication protocol identifier in the header portion illustrated in FIG. 13.

The transceiver 33 terminates the header portion of the downlink transfer packet illustrated in FIG. 13 and extracts the data portion (capsuling portion) to generate (extract) a downlink packet addressed to the device 2. The downlink packet generated by the transceiver 33 has the same data structure or substantially the same data structure as the downlink packet converted by the conversion processor 32b illustrated in FIG. 11.

Then, the transceiver 33 transmits the generated downlink packet to the transceiver 31.

The transceiver 31 transmits the downlink packet, which has been generated (extracted) by the removal of the header by the transceiver 33, to the device 2 through the LAN 5.

Therefore, the capsuling processor 32c and the transceivers 31 and 33 function as the generator 36.

That is, when the determination unit 32a determines that the GW 3 does not have the module 35a corresponding to the device 2, the generator 36 adds a header corresponding to the communication protocol used by the global network 6 to an uplink packet which is transmitted from the device 2 to the application server 8 to generate an uplink transfer packet.

In addition, the generator 36 removes the header from the downlink transfer packet received from the GW management server 9 to extract the downlink packet and performs a decapsuling process.

The capsuling processor 32c may perform the generation of the uplink transfer packet by the transceiver 33 (the addition of a header portion to the uplink packet) and the termination of the header portion from the downlink transfer packet by the transceiver 33.

The communication module update unit (control element update unit) 34 performs an update process of adding or deleting the module 35a which is stored in the database 35 by the GW 3 at a predetermined time. The communication module update unit 34 performs the update process when the module download function in the GW information table 35d is "present". An example of the predetermined time is the time when the counting process of the transceivers 31 and 33 as counters for a predetermined period ends and the module information table 35c is updated.

For example, the communication module update unit 34 includes a download determination unit 34a, a download unit 34b, and an update processor 34c.

The download determination unit 34a determines whether to download the module 35a from the center system 7 (GW management server 9) to the GW 3.

Specifically, the download determination unit 34a determines whether there is a module 35a whose arrangement destination is the GW management server 9 at a predetermined time, with reference to the module information table 35c.

When there is a module 35a whose arrangement destination is the GW management server 9, the download determination unit 34a acquires the available memory of the GW 3 from the GW information table 35d. In addition, the download determination unit 34a sequentially adds the memory requirement of the module ID in descending order of the number of times packets are transmitted and received, based on the module information table 35c, and extracts, as an arrangeable module ID list, the module IDs to which the memory requirement is added until the addition result is more than the available memory.

Then, when the module ID whose arrangement destination is the GW management server 9 is included in the arrangeable module ID list, the download determination unit 34a determines to download the module 35a with the module ID, with reference to the module information table 35c.

When the download determination unit 34a determines to download the module 35a, it instructs the download unit 34b to download the module 35a which is determined to be downloaded.

When the download determination unit 34a determines to download the module 35a, it changes the arrangement destination of the module 35a which is not included in the arrangeable module ID list to the GW management server 9, with reference to the module information table 35c. In addition, the download determination unit 34a instructs the update processor 34c to delete the module 35a whose arrangement destination has been changed to the GW management server 9.

When receiving a response indicating that the acquisition of the module 35a has been completed from the download unit 34b, the download determination unit 34a notifies the update processor 34c of the module ID of the downloaded module 35a and instructs the update processor 34c to install the module 35a. When receiving an installation completion response from the update processor 34c, the download determination unit 34a changes the arrangement destination of the installed module 35a to the GW 3, with reference to the module information table 35c.

The download determination unit 34a extracts a list of the module IDs whose arrangement destination is the GW 3 in the module information table 35c and transmits a request to update a GW management table 94d (see FIG. 14) to the GW management server 9.

Then, the download determination unit 34a updates the number of packet transmitting and receiving operations of all devices 2 to "0" in the device information table 35b.

The download unit 34b designates the module ID of the module 35a instructed by the download determination unit 34a and issues an acquisition request (module acquisition request) to the center system 7 (GW management server 9). When the module 35a is acquired (downloaded) from the GW management server 9, the download unit 34b returns an acquisition completion response to the download determination unit 34a.

The update processor 34c adds the module 35a downloaded by the download unit 34b to the database 35 and deletes the module 35a whose arrangement destination has been changed from the GW 3 to the GW management server 9 from the database 35.

Specifically, the update processor 34c acquires a module name corresponding to the module ID which is instructed to be deleted by the download determination unit 34a with reference to the module information table 35c and deletes the module 35a with the acquired module name from the database 35.

The update processor 34c acquires a module name corresponding to the module ID which is instructed to be installed by the download determination unit 34a with reference to the module information table 35c and adds (installs) the module 35a with the acquired module name to the database 35.

When the deletion or installation of the module 35a is completed, the update processor 34c returns a deletion completion response or an installation completion response to the download determination unit 34a.

As such, the communication module update unit 34 selects the module stored in the database 35 based on the count result of the transceivers 31 and 33 serving as counters and the storage capacity of the database 35. When the selected module 35a is not stored in the database 35, the communication module update unit 34 acquires the selected module 35a from the GW management server 9 and stores the selected module 35a in the database 35.

The communication module update unit 34 deletes the modules 35a other than the selected module 35a from the database 35.

Therefore, according to the communication module update unit 34, when the GW 3 can download the module 35a (software), it is possible to preferentially arrange the module 35a with the largest number of packet transmitting and receiving operations (highest communication frequency) in the GW 3. Therefore, it is possible to reduce the communication load of the GW 3 and the center system 7.

According to the communication module update unit 34, the module 35a whose arrangement destination is the GW management server 9 is deleted from the GW 3. Therefore, it is possible to effectively use the limited resources of the database 35 in the GW 3.

The communication module update unit 34 can periodically update the memory module information table 35c. For example, the communication module update unit 34 periodically acquires (copies) the module ID, the module name, the port number of the module, and information about the memory requirement from the GW management server 9 (module management table 94c (see FIG. 14)) and updates (generates) the module information table 35c. In this case, when there is a module ID which is newly registered from the module management table 94c to the module information table 35c, the communication module update unit 34 sets the arrangement destination of the module ID to the GW management server 9.

The CPU 30a develops the processing program in, for example, the memory 30b and executes the processing program to implement each functional block of the GW 3 according to this embodiment.

[1-5] Example of Structure of Center System

Next, an example of the structure of the center system 7 will be described with reference to FIGS. 14 to 18. FIG. 14 is a diagram illustrating an example of the structure of the center system 7 illustrated in FIG. 1. FIGS. 15 to 17 are diagrams illustrating examples of a device management table 94b, the module management table 94c, and the GW management table 94d held by the GW management server 9 illustrated in FIG. 1.

Figure 14:
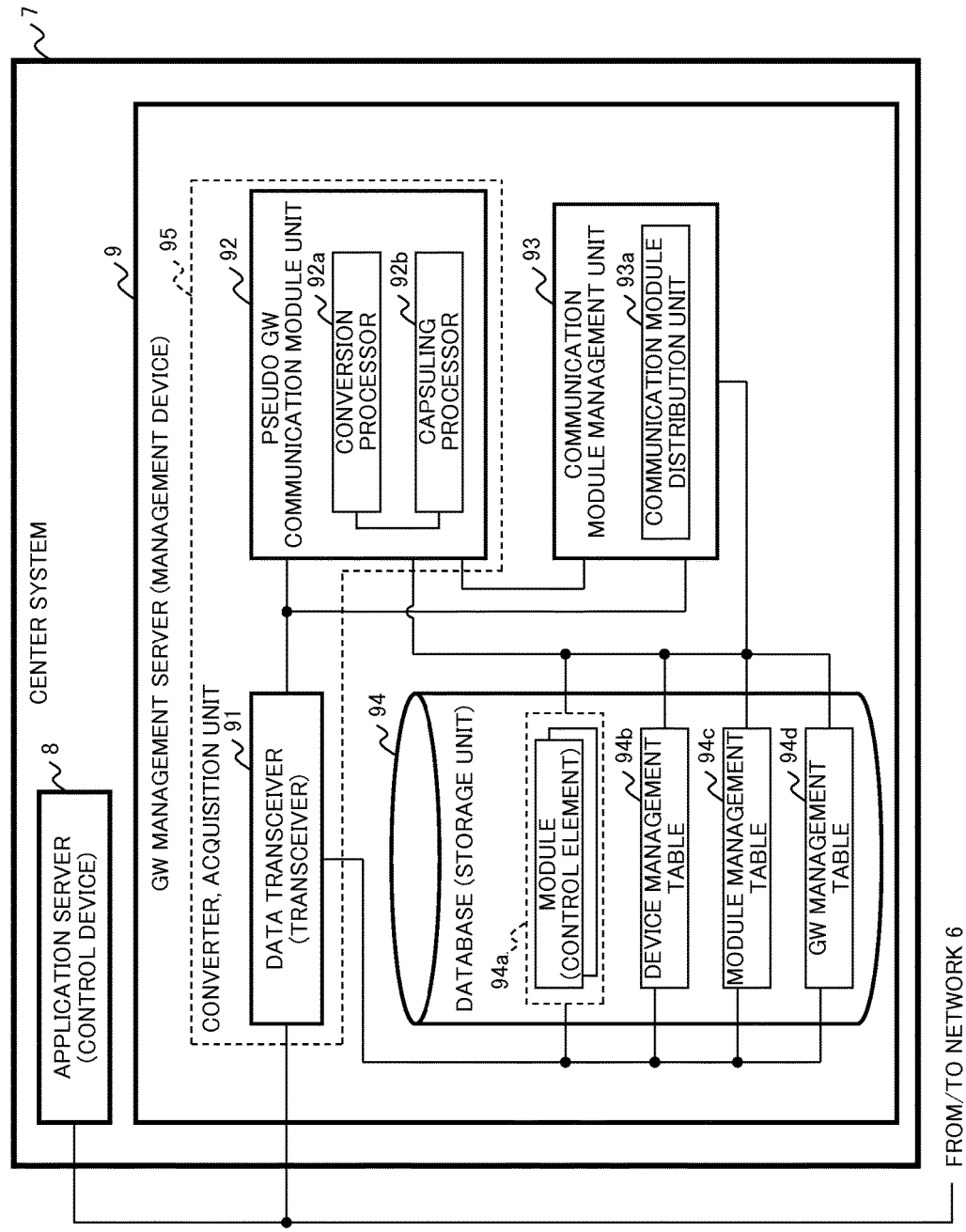
FIG. 14 is a diagram illustrating an example of the structure of a center system illustrated in FIG. 1.

As illustrated in FIG. 14, the center system 7 includes the application server 8 and the GW management server 9.

The application server 8 manages the device 2 and the information (the device ID and the GW-ID) of the GW 3 corresponding to the device 2. In the application server 8, when a device 2 or a GW 3 is newly added, a device ID and a GW-ID is notified through the GW management server 9 (device information registration notice).

When receiving the uplink packet including the device data of the device 2 from the GW 3 or the GW management server 9, the application server 8 interprets the device data in, for example, an XML format and performs predetermined processing, such as monitoring or control.

The application server 8 transmits a query for the transmission destination of the downlink packet (device control request destination query) to the GW management server 9, prior to the transmission of the downlink packet including the device data (device data; data for monitoring or controlling the device 2). The device control request destination query includes the device ID of the device 2, which is the transmission destination of the downlink packet, and the GW-ID of the corresponding GW 3. When receiving the IP address of the GW 3 or the GW management server 9 as a response to the device control request destination query from the GW management server 9, the application server 8 transmits the downlink packet to the received IP address as the transmission destination.

The GW management server 9 includes a data transceiver 91, the pseudo GW communication module unit 92, a communication module management unit 93, and a database 94.

The database (storage unit) 94 stores all modules (control elements) 94a corresponding to the types of protocols used by the devices 2 in the communication system 1. The module 94a stored in the database 94 is used in the packet communication protocol conversion process of the pseudo GW communication module unit 92. For example, the administrator of the GW management server 9 manually performs the addition or deletion of the module 94a stored in the database 94 and the update of the module management table 94c, which will be described below.

The module 94a is the same program or parameter as the module 35a, but is denoted by a reference numeral different from that of the module 35a for convenience.

The database 94 includes the device management table 94b, the module management table 94c, and the GW management table 94d. The database 94 is implemented by, for example, the memory 90b or the storage unit 90c illustrated in FIG. 3.

As illustrated in FIG. 15, the device management table 94b is used to manage the information of the device 2 connected to each GW 3. Specifically, the device management table 94b includes, as an item, the GW-ID of the GW 3 connected to the device 2, in addition to the items of the device information table 35b illustrated in FIG. 5 except for the MAC address.

For example, the device management table 94b includes information in which a GW-ID "GW 1", a local device IP address "192.168.0.10", a corresponding module ID "1", and a GW registration date and time "2013/01/30 10:40:20" are associated with a device ID "DVA1".

As illustrated in FIG. 16, the module management table 94c is used to manage the information of all modules 94a corresponding to the communication protocols which enable communication in the communication system 1. Specifically, the module management table 94c includes the same items as the module information table 35c illustrated in FIG. 6 except for the arrangement destination and the number of times packets are transmitted and received.

For example, the module management table 94c includes information in which a module name "module-a", a port number "100", and a memory requirement "100K" are associated with a module ID "1".

The module management table 94c is updated when the administrator installs the module 94a in the database 94 or deletes the module 94a from the database 94.

As illustrated in FIG. 17, the GW management table 94d is used to manage the information of each GW 3 connected to the communication system 1. Specifically, the GW management table 94d includes, as an item, a list of the module IDs of the modules 35a arranged in the GW 3, in addition to the items of the GW information table 35d illustrated in FIG. 7.

For example, the GW management table 94d includes information in which a local GW-IP address "192.168.0.1", a global GW-IP address "180.200.10.15", and an available memory "200K" are associated with a GW-ID "GW 1". In addition, in the GW management table 94d, the presence or absence of a module download function "absent" and a provided communication module ID "1" are further associated with the GW-ID "GW 1".

Similarly to the GW information table 35d, the GW management table 94d is manually registered by, for example, the administrator through the input/output unit 90e or the global network 6 when the GW 3 is installed in the device installation area 10. When an update request is received from the GW 3 with the completion of the installation of the module 35a, the communication module ID provided in the GW management table 94d may be updated by the GW management server 9.

The data transceiver 91 communicates with (transmits and receives packets to and from) the GW 3 and the application server 8. Hereinafter, the data transceiver 91 is simply referred to as a transceiver 91.

The transceiver 91 is implemented by the LAN interface unit 90d and a processor such as the CPU 90a, illustrated in FIG. 3.

The process of the transceiver 91 transmitting the packets received from the GW 3 or the application server 8 will be described in detail in the description of the pseudo GW communication module unit 92.

When receiving the device control request destination query including the device ID and the GW-ID from the application server 8, the transceiver 91 acquires the module ID corresponding to the device ID with reference to the device management table 94b. In addition, the transceiver 91 determines whether the module 35a with the acquired module ID is included in the GW 3 with the GW-ID, with reference to the GW management table 94d.

The transceiver 91 returns the IP address of the GW 3 as a response to the device control request destination query when the module 35a is included in the GW 3 and returns the IP address of the GW management server 9 as a response when the module 35a is not included in the GW 3.

As described above, when the device information table 35b is updated by, for example, the connection of the device 2, the GW 3 notifies the GW management server 9 of the updated information of the device 2 (a GW-ID, a device ID, a device IP address, a corresponding module ID, and a registration date and time) (device information registration request).

When receiving the device information registration request from each GW 3, the transceiver 91 associates the received information with the GW-ID of the GW 3, which is a transmission source, to update the device management table 94b. Then, the transceiver 91 transmits the GW-ID and the device ID among the updated information items as the device information registration notice to the application server 8.

The pseudo GW communication module unit 92 interprets the communication protocol of the device 2 and controls the communication of packets transmitted and received between the GW 3 and the center system 7 (application server 8).

For example, the pseudo GW communication module unit 92 includes a conversion processor 92a and a capsuling processor 92b.

The conversion processor 92a performs a packet communication protocol conversion process using the module 94a which processes data for each communication protocol.

The capsuling processor 92b performs a downlink packet capsuling process.

Next, the processes of the conversion processor 92a and the capsuling processor 92b will be described.

First, a case in which a downlink packet is transmitted from the application server 8 to the GW management server 9, that is, the GW 3 does not have the module 35a for converting a downlink packet communication protocol will be described.

When a downlink packet (see FIG. 10) including a control instruction transmitted from the application server 8 to the device 2 is received, the transceiver 91 determines the corresponding module ID from the device ID in the data portion of the downlink packet with reference to the device management table 94b. Then, the transceiver 91 transmits the downlink packet to the conversion processor 32b for the determined module 94a.

When receiving the downlink packet from the transceiver 91, the conversion processor 92a acquires a local GW-IP address from the GW management table 94d and acquires a local device IP address from the device management table 94b.

Then, in the conversion process, the conversion processor 92a converts the data format of the data portion in the packet illustrated in FIG. 10 from the data format used by the application server 8 to the data format of the packet illustrated in FIG. 13 which is used by the device 2. Specifically, the conversion processor 92a extracts the device data in the data portion of the packet illustrated in FIG. 10, interprets the device data using the module 94a, and converts (translates) the device data into data of a data format which can be interpreted by the device 2. In addition, the conversion processor 92a transmits the converted data portion of the downlink packet and each acquired IP address to the capsuling processor 92b.

The capsuling processor 92b performs a capsuling process of adding a header portion corresponding to the communication protocol used by the device 2 to the data portion of the downlink packet converted by the conversion processor 92a to generate a new data portion.

Specifically, the capsuling processor 92b adds the local GW-IP address and the local device IP address output from the conversion processor 92a and the local communication protocol identifier used by the device 2 as the header portion to the data portion of the downlink packet. Then, the capsuling processor 92b transmits the generated new data portion to the transceiver 91.

The transceiver 91 adds a header portion corresponding to the communication protocol used in the global network 6 to the new data portion received from the capsuling processor 92b to generate a downlink transfer packet (see FIG. 13). For example, the transceiver 91 acquires the global GW-IP address of the GW 3 in which the device ID of the device 2, which is a transmission destination, is accommodated, with reference to the GW management table 94d. Then, the transceiver 91 sets, as a header portion of the downlink transfer packet, the acquired global GW-IP address, the global IP address of the GW 3, and the port number of the HTTP to the transmission destination, the transmission source, and the communication protocol, respectively.

The transceiver 91 transmits the generated downlink transfer packet to the GW 3 through the global network 6 and the router 4.

Next, a case in which an uplink transfer packet is transmitted from the GW 3 to the GW management server 9, that is, the GW 3 does not have the module 35a for converting the uplink packet communication protocol will be described.

When the uplink transfer packet is received from the GW 3, the transceiver 91 terminates the header portion, extracts the data portion (capsuling portion), and transmits the data portion to the capsuling processor 92b.

The capsuling processor 92b acquires the GW-ID from the data portion of the uplink transfer packet. The capsuling processor 92b acquires the device ID and the corresponding module ID based on the GW-ID and the local device IP address of the data portion, with reference to the device management table 94b. In addition, the capsuling processor 92b acquires the information of the module 94a related to the corresponding module ID, with reference to the module management table 94c.

Then, the capsuling processor 92b transmits the data portion of the uplink transfer packet and the acquired information to the conversion processor 92a.

The conversion processor 92a operates the module 94a related to the module ID which is received from the conversion processor 92a to interpret the communication protocol and converts (translates) the data format of the device data in the received data portion into a data format, such as XML, which can be interpreted by the application server 8. In addition, the conversion processor 92a adds the GW-ID and the device ID to the head of the converted device data to generate a new data portion and transmits the new data portion to the transceiver 91.

Figure 18:
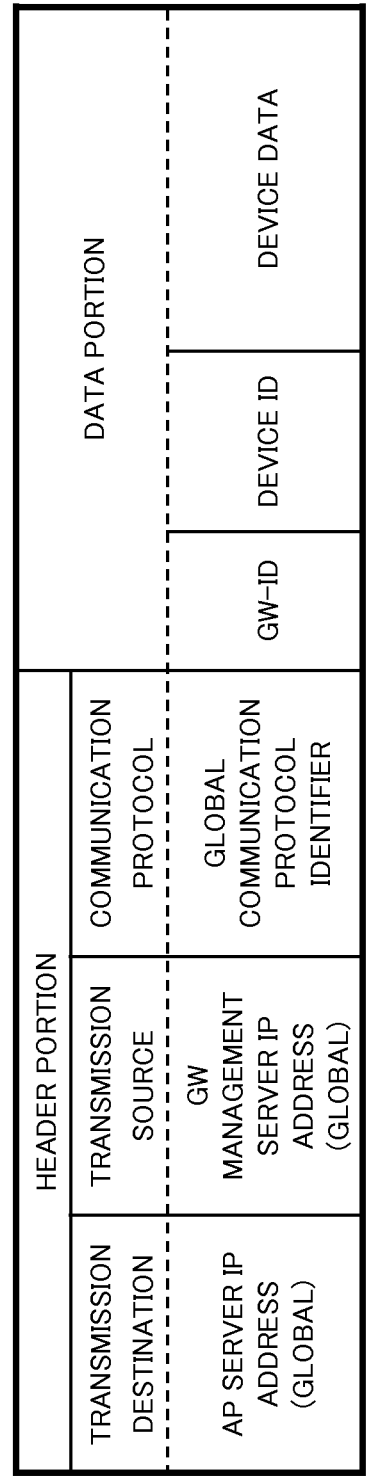
FIG. 18 is a diagram illustrating an example of the structure of a packet transmitted from the GW management server to the application server illustrated in FIG. 1.

FIG. 18 is a diagram illustrating an example of the structure of the packet transmitted from the GW management server 9 to the application server 8 illustrated in FIG. 1.

The data structure of the packet illustrated in FIG. 18 is the same or substantially the same as that of the packet illustrated in FIG. 9.

A header portion illustrated in FIG. 18 differs from the header portion illustrated in FIG. 9 in that the IP address of the transmission source is not the GW 3, but is the GW management server 9.

The port number of the communication protocol (second communication rule) which is used by the GW management server 9 and the application server 8 (which is used in the global network 6) is given as an example of the global communication protocol identifier in the header portion illustrated in FIG. 18.

The transceiver 91 adds a header portion corresponding to the communication protocol used in the global network 6 to the new data portion transmitted from the conversion processor 92a to generate an uplink packet. For example, the transceiver 91 sets, as the header portion, the global IP address of the application server 8, the global IP address of the GW management server 9, and the port number of the HTTP to the transmission destination, the transmission source, and the communication protocol, respectively.

Then, the transceiver 91 transmits the generated uplink packet to the application server 8 through the global network 6.

Therefore, the conversion processor 92a, the capsuling processor 92b, and the transceiver 91 function as an acquisition unit 95 and a converter 95.

That is, when receiving the uplink transfer packet, the acquisition unit 95 removes the header added to the received uplink transfer packet to extract the uplink packet and performs a decapsuling process.

The converter 95 converts the communication protocol of the uplink packet which is extracted by the header removal process of the acquisition unit 95 from the communication protocol used by the device 2 to the communication protocol used in the global network 6, using the module 94a stored in the database 94.

In addition, the converter 95 converts the communication protocol of the downlink packet received from the application server 8 from the communication protocol used in the global network 6 to the communication protocol used by the device 2, using the module 94a stored in the database 94.

The acquisition unit 95 adds a header corresponding to the communication protocol used in the global network 6 to the downlink packet converted by the converter 95 and performs a capsuling process to generate a downlink transfer packet.

The generation of the downlink transfer packet by the transceiver 91 (the addition of the header portion to the downlink packet) and the termination of the header portion in the uplink transfer packet by the transceiver 91 may be performed by the capsuling processor 92b.

The communication module management unit 93 manages the module 94a in the GW management server 9. For example, the communication module management unit 93 manages a correspondence list (not illustrated) between the port numbers and the communication protocols through an update operation of the administrator to detect the latest communication protocol which can correspond in the communication system 1. For example, the communication module management unit 93 includes a communication module distribution unit 93a.

The communication module distribution unit 93a distributes the corresponding module 94a to the GW 3 in response to a request to download the module 94a from the GW 3.

For example, when a module acquisition request is received from the GW 3, the communication module management unit 93 acquires the module name of the module with the notified module ID, with reference to the module management table 94c. Then, the communication module management unit 93 instructs the communication module distribution unit 93a to distribute a module file including the module 94a with the acquired module name and various files which are used to operate the module 94a.

The communication module distribution unit 93a acquires the module file instructed by the communication module management unit 93 from, for example, the database 94 (storage unit 90c) and transmits the module file to the GW 3.

As described above, in the communication system 1 according to this embodiment, the GW 3 can determine whether to provide the module 35a in the host GW 3 or to provide the module 94a in the center system 7 (GW management server 9) for each type of communication protocol of the device 2, based on the amount of packet communication for each communication protocol.

Therefore, for example, when the resources of the GW 3 are insufficient to include all modules 35a to be monitored and controlled, some of the modules 35a (94a) can be provided in the center system 7. In this case, for example, when a new device 2 added to the LAN 5 executes communication protocol software which frequently communicates with the GW 3, the GW 3 can be provided with the corresponding module 35a. Therefore, it is possible to perform a communication protocol conversion process with a small time delay for the device 2 which frequently performs communication and to suppress the traffic of the center system 7 through the global network 6, which is a wide area communication network.

In a case in which the GW 3 selects to provide the module 94a in the center system 7, even when communication occurs in the device 2 which uses the communication protocol corresponding to the module 94a, the GW 3 transmits communication from the device 2 to the GW management server 9 to implement the communication of the device 2.

[1-6] Example of Operation

Next, an example of the operation of the communication system 1 according to the embodiment having the above-mentioned structure will be described with reference to FIGS. 19 to 30. In the following description, it is assumed that the GW 3 has a function of downloading the module 35a.

[1-6-1] Example of Operation when Data is Transmitted from Device

Figure 19:
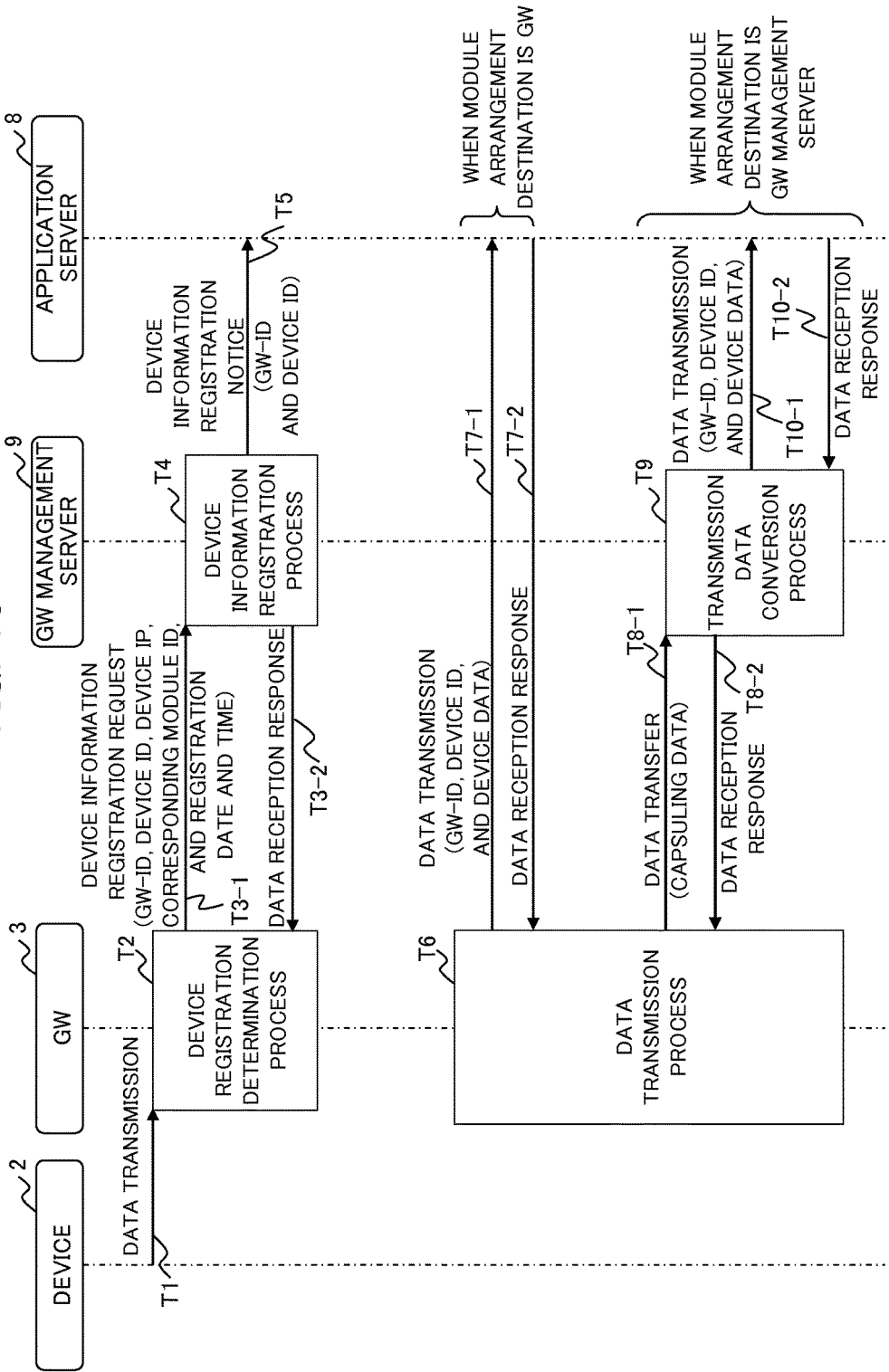
FIG. 19 is a sequence diagram illustrating a process in the communication system illustrated in FIG. 1 when an uplink packet is transmitted from the device.
Figure 20:
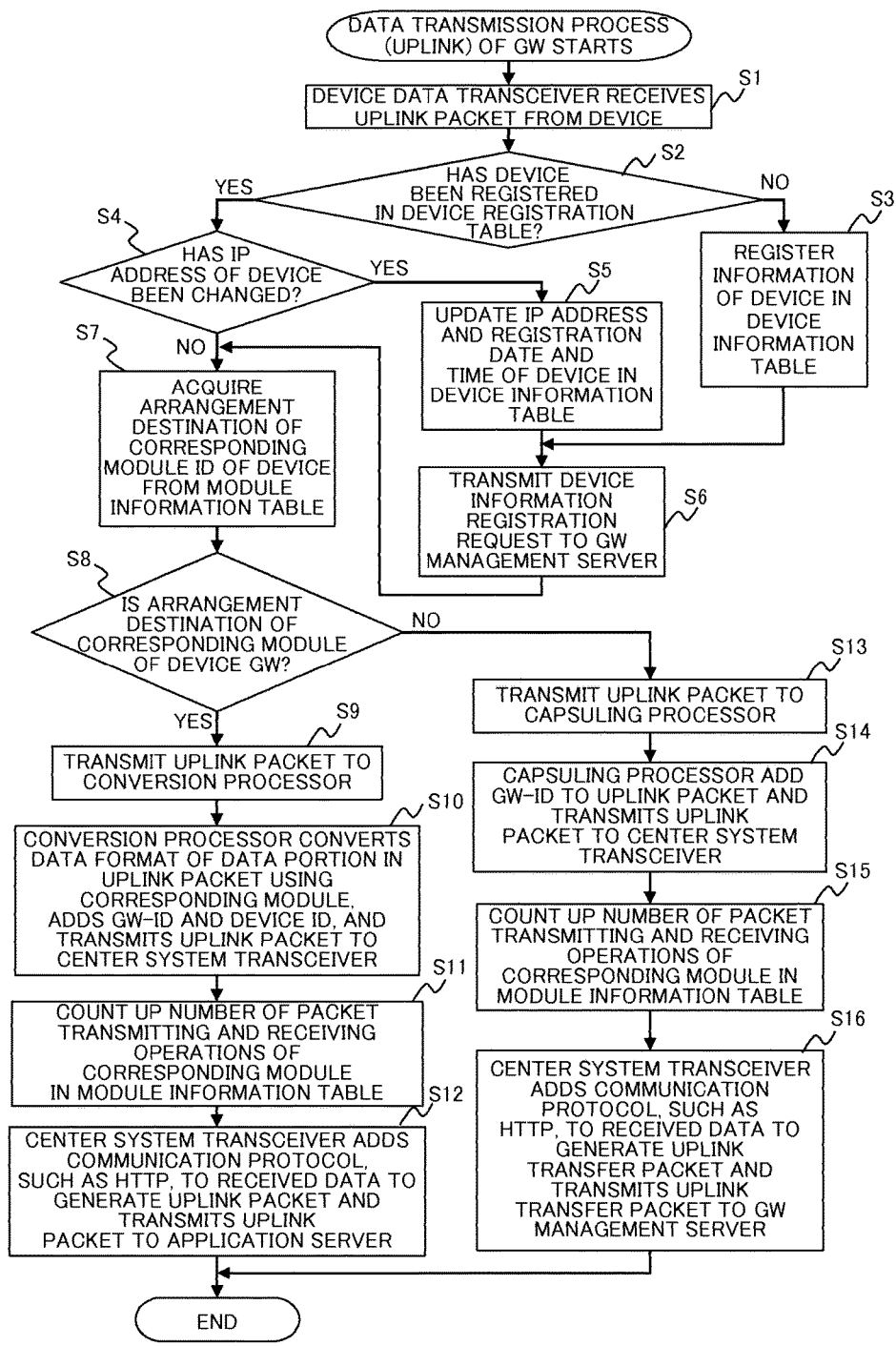
FIG. 20 is a flowchart illustrating a data transmission process of the GW illustrated in FIG. 19 when an uplink packet is transmitted from the device.
Figure 21:
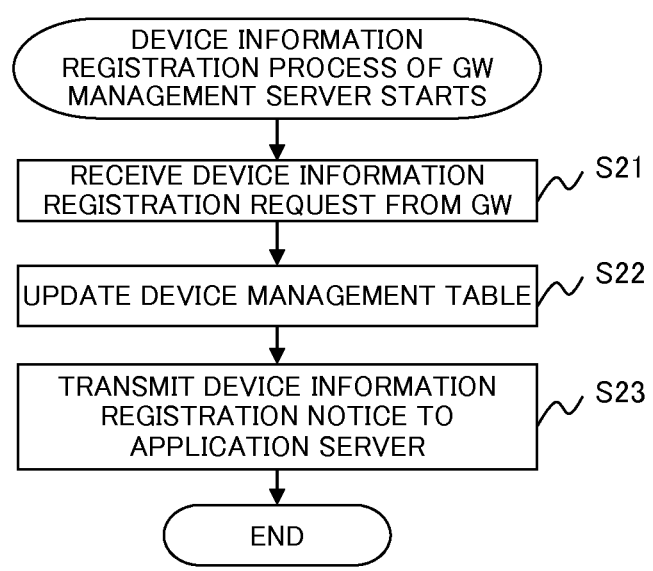
FIG. 21 is a flowchart illustrating a device information registration process of the GW management server illustrated in FIG. 19.
Figure 22:
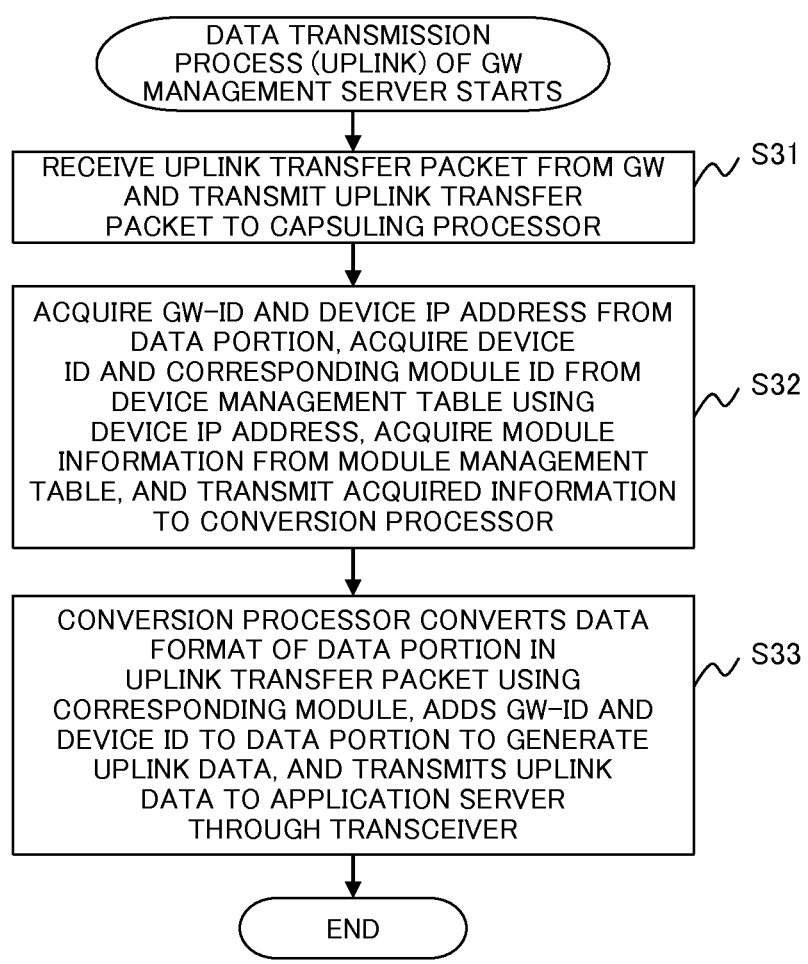
FIG. 22 is a flowchart illustrating a transfer data conversion process of the GW management server illustrated in FIG. 19 when an uplink packet is transmitted from the device.

First, the processes of the GW 3 and the GW management server 9 when data (uplink packet) is transmitted from the device 2 to the application server 8 will be described with reference to FIGS. 19 to 22. FIG. 19 is a sequence diagram illustrating a process in the communication system 1 illustrated in FIG. 1 when an uplink packet is transmitted from the device 2. FIG. 20 is a flowchart illustrating a data transmission process of the GW 3 illustrated in FIG. 19 when the uplink packet is transmitted from the device 2. FIG. 21 is a flowchart illustrating a device information registration process of the GW management server 9 illustrated in FIG. 19. FIG. 22 is a flowchart illustrating a transfer data conversion process of the GW management server 9 illustrated in FIG. 19 when the uplink packet is transmitted from the device 2.

First, as illustrated in FIG. 19, when sensing data or data (uplink packet) for a notice of a change in state is autonomously transmitted from the device 2 (Step T1) and is then received by the device data transceiver 31 of the GW 3 (see Step S1 in FIG. 20), the GW 3 performs a device registration determination process (Step T2).

As illustrated in FIG. 20, in the device registration determination process, the device data transceiver 31 determines whether the MAC address of the received device IP address has been registered in the device information table 35b (Step S2).

When the MAC address has not been registered (a No route in Step S2), the transceiver 31 generates a unique device ID for specifying the device 2 from the MAC address. In addition, the transceiver 31 registers a device ID, a device IP address, a MAC address, and a registration date and time in the device information table 35b. The transceiver 31 specifies a module 35a corresponding to the communication protocol from the port number used in the received uplink packet, with reference to the module information table 35c. Then, the transceiver 31 registers the specified corresponding module ID in the device information table 35b (Step S3).

Then, the center system transceiver 33 transmits a device information registration request for the newly registered information of the device 2 (the GW-ID, the device ID, the device IP address, the corresponding module ID, and the registration date and time) to the GW management server 9 (Step S6 and Step T3-1 in FIG. 19). The GW management server 9 returns a data reception response to the transceiver 33 (Step T3-2).

When it is determined in FIG. 20 that the MAC address of the received device IP address has been registered in the device information table 35b (a Yes route in Step S2), the transceiver 31 determines whether the device IP address has been changed (Step S4). When the device IP address has been changed (a Yes route in Step S4), the transceiver 31 updates the registration date and time and the device IP address of the device 2 with the MAC address in the device information table 35b (Step S5) and the process proceeds to Step S6.

When it is determined in Step S4 that the device IP address has not been changed (a No route in Step S4), the transceiver 31 transmits the uplink packet to the determination unit 32a. The determination unit 32a performs the data transmission process (Step T6) illustrated in FIG. 19.

Specifically, as illustrated in FIG. 20, the determination unit 32a compares the received device IP address of the device 2 with the IP address corresponding to the MAC address in the device information table 35b.

On the other hand, when it is determined in Step S4 that the device IP address has not been changed (a No route in Step S4) or when the process in Step S6 is completed, the transceiver 31 proceeds to Step S7 (see Step T6 in FIG. 19).

In Step S7, the uplink packet is transmitted from the transceiver 31 or 33 to the determination unit 32a and the determination unit 32a acquires the arrangement destination of the corresponding module ID of the device 2 from the module information table 35c.

Then, the determination unit 32a determines whether the arrangement destination of the corresponding module 35a of the device 2 is the GW 3 (Step S8).

When the arrangement destination is GW 3 (a Yes route in Step S8), the determination unit 32a transmits the uplink packet to the conversion processor 32b (corresponding module 35a) (Step S9).

Then, the conversion processor 32b interprets the communication protocol of the uplink packet using the module 35a and converts (translates) the data format of the device data in the data portion of the uplink packet into a data format which can be interpreted by the application server 8. The conversion processor 32b adds the GW-ID of the host GW in the GW information table 35d and the device ID in the device information table 35b to the data portion to generate a data portion and transmits the generated data portion to the transceiver 33 (Step S10).

The transceiver 33 counts up the number of packet transmitting and receiving operations (the number of receiving operations) of the corresponding module 35a in the module information table 35c (Step S11).

In addition, the transceiver 33 adds a communication protocol, such as an HTTP, to the data portion received from the conversion processor 32b (adds a header portion) to generate an uplink packet and transmits the uplink packet to the application server 8 (Step S12 and Step T7-1 in FIG. 19). Then, the process ends. When the uplink packet is received, the application server 8 returns a data reception response (Step T7-2).

On the other hand, when it is determined in Step S8 of FIG. 20 that the arrangement destination of the corresponding module 35*a* is not the GW 3 (the arrangement destination is the GW management server 9) (a No route in Step S8), the determination unit 32*a* transmits the uplink packet to the capsuling processor 32*c* (Step S13).

The capsuling processor 32*c* does not interpret the communication protocol of the data received from the device 2, adds the GW-ID of the host GW to the received data (uplink packet) to generate a data portion (capsuling portion), and transmits the generated data portion to the transceiver 33 (Step S14).

The transceiver 33 counts up the number of packet transmitting and receiving operations (the number of receiving operations) of the corresponding module 35*a* in the module information table 35*c* (Step S15).

The transceiver 33 adds a communication protocol, such as an HTTP, to the data portion received from the capsuling processor 32*c* (adds a header portion) to generate an uplink transfer packet and transmits the uplink transfer packet to the GW management server 9 (Step S16 and Step T8-1 in FIG. 19). Then, the process ends. When the uplink transfer packet is received, the GW management server 9 returns a data reception response (Step T8-2).

In this way, the GW 3 performs the data transmission process when the uplink packet is transmitted from the device 2.

Next, as illustrated in FIG. 21, a device information registration process (Step T4 in FIG. 19) of the GW management server 9 when a device information registration request is received from the GW 3 (Step S21) will be described.

In the GW management server 9, the transceiver 91 updates the device management table 94*b* based on the information of the device 2 received from the GW 3 (Step S22 in FIG. 21). Then, the transceiver 91 transmits a device information registration notice including the GW-ID and the device ID to the application server 8 (Step S23 and Step T5 in FIG. 19). Then, the process ends.

In this way, the GW management server 9 performs the device information registration process.

Next, as illustrated in FIG. 22, a transfer data conversion process (Step T9 in FIG. 19) of the GW management server 9 when the uplink transfer packet is received from the GW 3 (Step S31) will be described.

As illustrated in FIG. 22, in Step S31, the transceiver 91 terminates the header portion of the received uplink transfer packet and transmits the data portion to the capsuling processor 92*b*.

The capsuling processor 92*b* acquires the GW-ID and the device IP address from the data portion of the uplink transfer packet. In addition, the capsuling processor 92*b* acquires the device ID based on the device IP address and the corresponding module ID with reference to the device management table 94*b*.

Then, the capsuling processor 92*b* acquires the information of the module 94*a* corresponding to the module ID with reference to the module management table 94*c* and transmits the acquired information to the conversion processor 92*a* (Step S32).

In Step S32, the conversion processor 92*a* interprets the communication protocol of the data portion using the corresponding module 94*a* and converts (translates) the data format of the data portion into a data format, such as XML, which can be interpreted by the application server 8. In addition, the conversion processor 92*a* adds the GW-ID and the device ID to the converted data portion to generate a new data portion. Then, the transceiver 91 adds a header portion to the data portion received from the conversion processor 92*a* to generate an uplink packet and transmits the uplink packet to the application server 8 (Step S33 and Step T10-1 in FIG. 19). Then, the process ends. When the uplink packet is received, the application server 8 returns a data reception response (Step T10-2).

In this way, the GW management server 9 performs the transfer data conversion process when the uplink transfer packet is transmitted from the GW 3.

[1-6-2] Example of Operation when Data is Transmitted from Application Server

Figure 23:
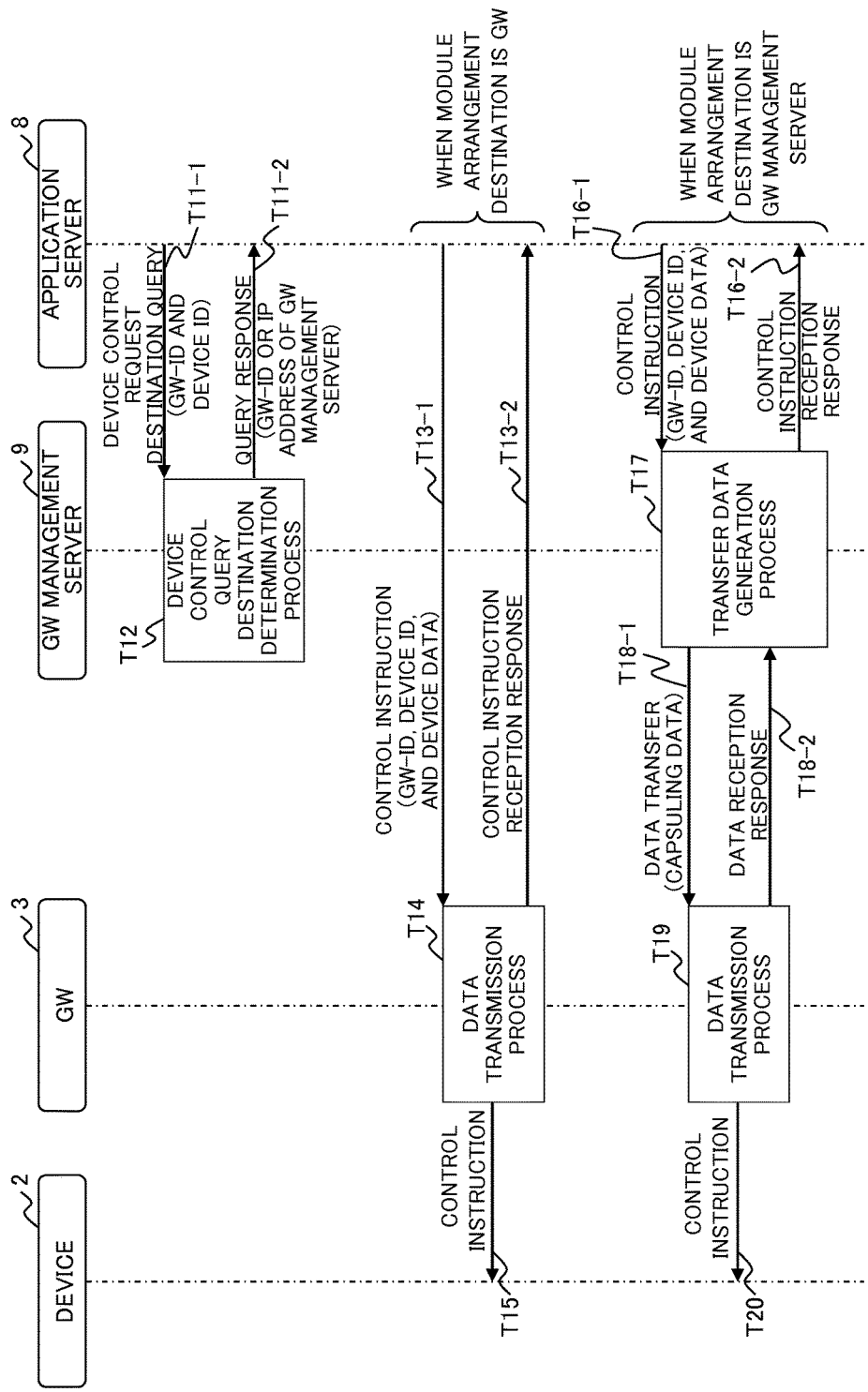
FIG. 23 is a sequence diagram illustrating a process in the communication system illustrated in FIG. 1 when a downlink packet is transmitted from the application server.
Figure 24:
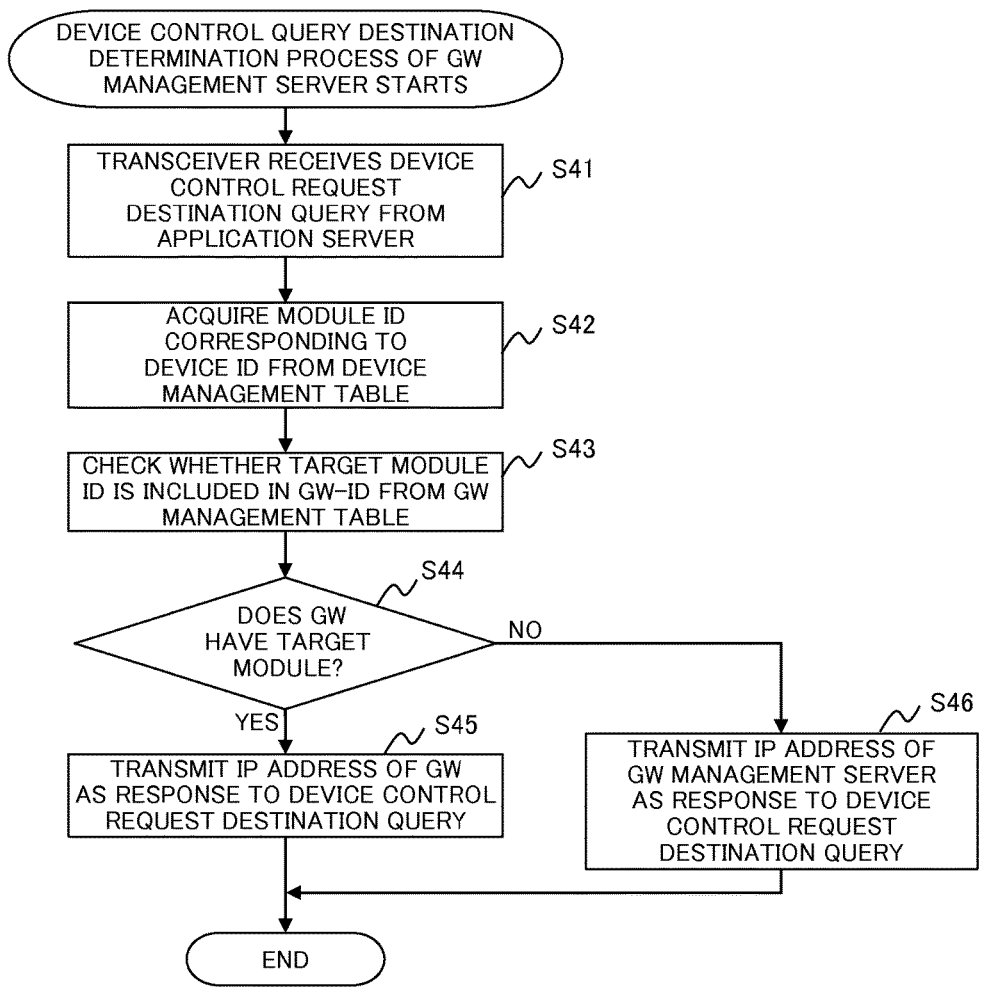
FIG. 24 is a flowchart illustrating a device control query destination determination process of the GW management server illustrated in FIG. 23.
Figure 25:
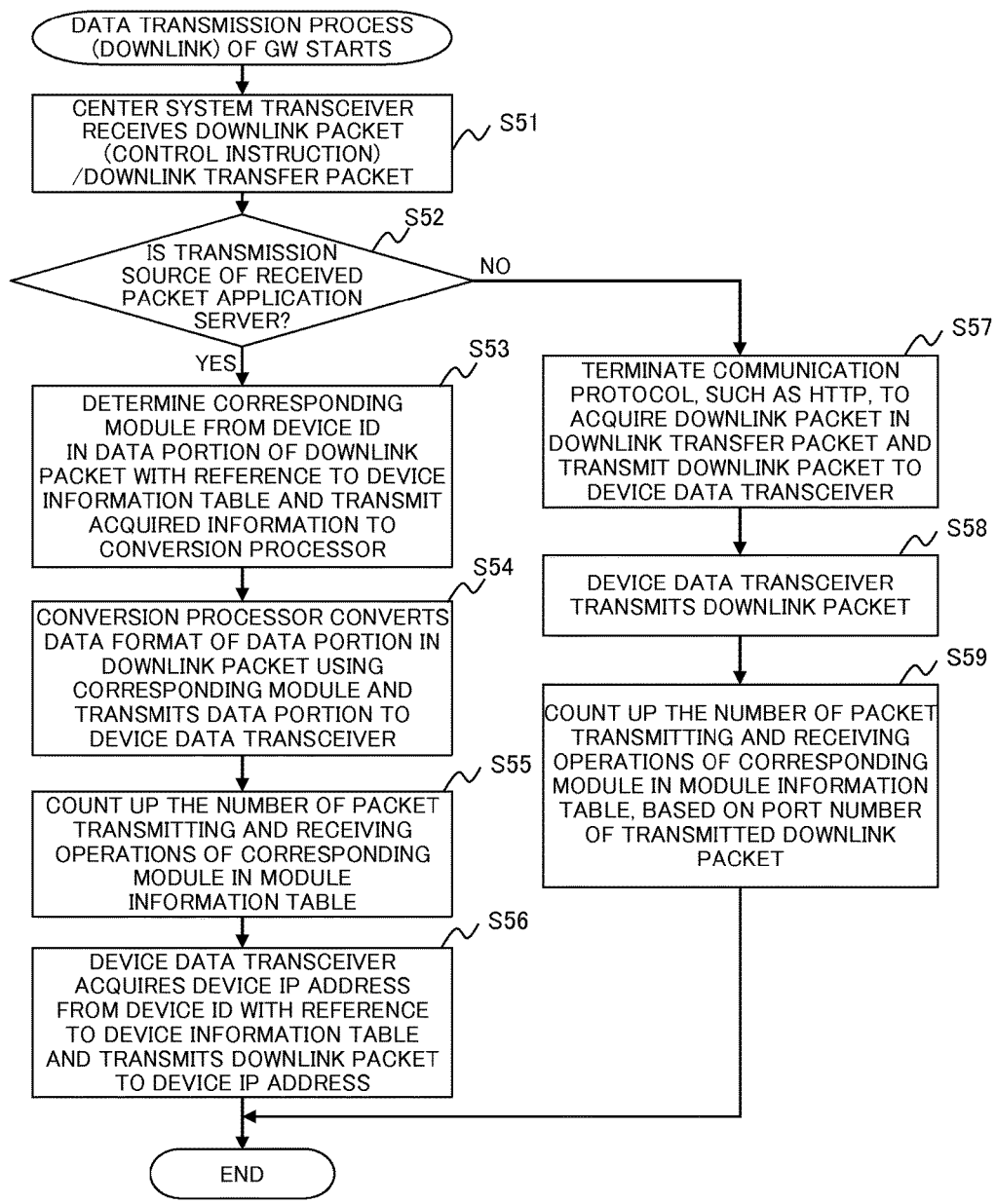
FIG. 25 is a flowchart illustrating a data transmission process of the GW illustrated in FIG. 23 when a downlink packet is transmitted from the application server or the GW management server.
Figure 26:
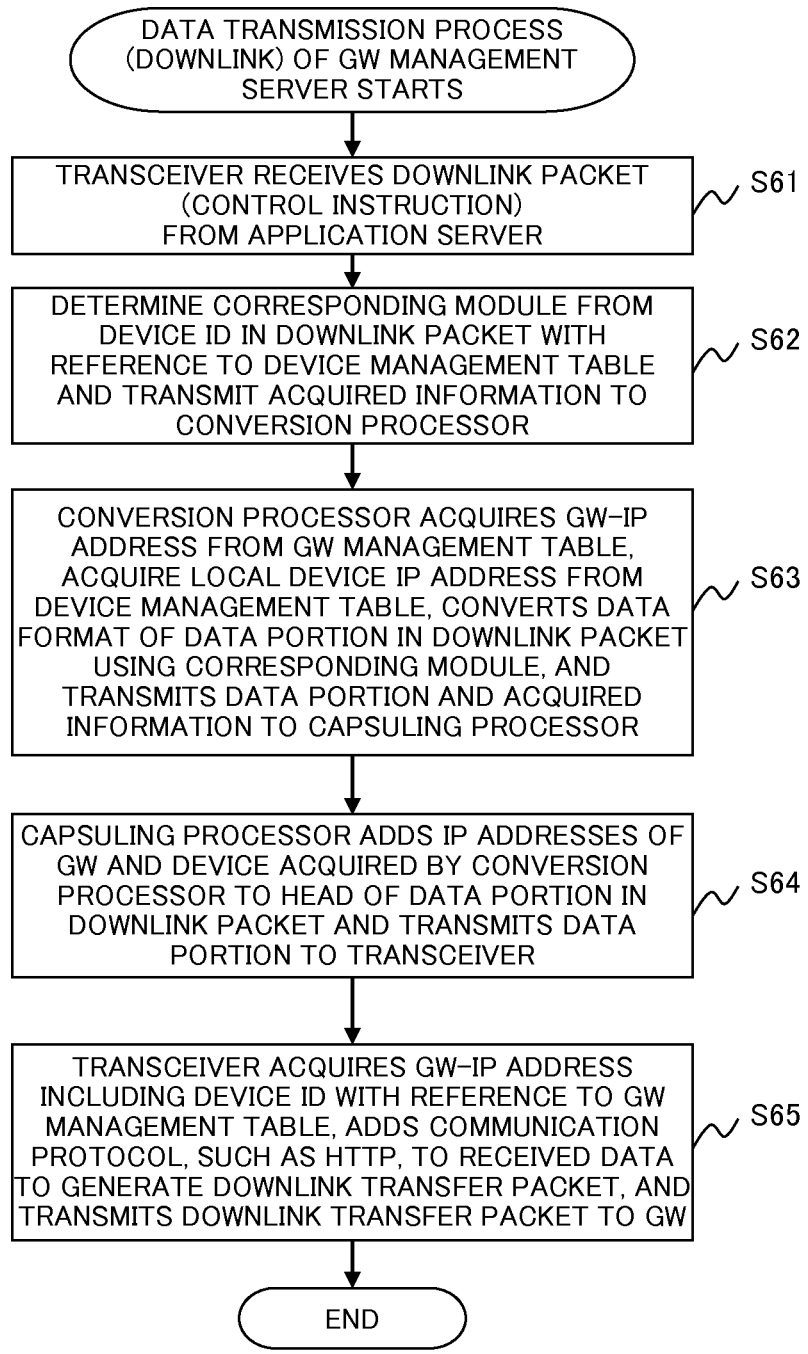
FIG. 26 is a flowchart illustrating a transfer data generation process of the GW management server illustrated in FIG. 23 when a downlink packet is transmitted from the application server.

Next, the processes of the GW 3 and the GW management server 9 when data (downlink packet) is transmitted from the application server 8 to the device 2 will be described with reference to FIGS. 23 to 26. FIG. 23 is a sequence diagram illustrating a process in the communication system 1 illustrated in FIG. 1 when the downlink packet is transmitted from the application server 8. FIG. 24 is a flowchart illustrating a device control query destination determination process of the GW management server 9 illustrated in FIG. 23. FIG. 25 is a flowchart illustrating a data transmission process of the GW 3 illustrated in FIG. 23 when the downlink packet is transmitted from the application server 8 or the GW management server 9. FIG. 26 is a flowchart illustrating a transfer data generation process of the GW management server 9 illustrated in FIG. 23 when the downlink packet is transmitted from the application server 8.

First, as illustrated in FIG. 23, the application server 8 transmits the device control request destination query to the GW management server 9, prior to the transmission of a downlink packet including an instruction (device data) for the device 2 to acquire the latest status data or a control instruction to control the device 2 (Step T11-1).

When the transceiver 91 receives the query from the application server 8 (Step S41 in FIG. 24), the GW management server 9 performs a device control query destination determination process (Step T12 in FIG. 23).

Specifically, as illustrated in FIG. 24, the transceiver 91 acquires the module ID corresponding to the device ID included in the query with reference to the device management table 94*b* (Step S42).

Then, the transceiver 91 checks whether a target module ID is included in the GW-ID included in the query from the GW management table 94*d* (Step S43) and determines whether the GW 3 has a target module 94*a* (Step S44).

When the GW 3 has the target module 94*a* (a Yes route in Step S44), the transceiver 91 transmits the IP address of the GW 3 as a device control request destination query response (Step S45). Then, the process ends. On the other hand, when the GW 3 does not have the target module 94*a* (a No route in Step S44), the transceiver 91 transmits the IP address of the GW management server 9 as the device control request destination query response (Step S46). Then, the process ends.

In this way, the GW management server 9 performs the device control query destination determination process.

Next, as illustrated in FIG. 25, the data transmission process (Steps T14 and T19 in FIG. 23) of the GW 3 when the downlink packet or the downlink transfer packet is received from the application server 8 or the GW management server 9 (Step S51 and Step T13-1 or T18-1 in FIG. 23) will be described.

The application server 8 transmits a control instruction (downlink packet) to the IP address which is returned as the device control request destination query response from the GW management server 9 (Step T13-1 or T16-1 in FIG. 23). In the data transmission processes T14 and T19, the GW 3 responds to the downlink packet or the downlink transfer packet received from the application server 8 or the GW management server 9 (Step T13-2 or T18-2 in FIG. 23).

As illustrated in FIG. 25, in the GW 3, the transceiver 33 determines whether the transmission source of the received packet is the application server 8 (Step S52).

When the transmission source is the application server 8 (a Yes route in Step S52), the transceiver 33 determines the corresponding module 35*a* from the device ID in the data portion of the downlink packet with reference to the device information table 35*b*. Then, the transceiver 33 transmits the data portion and the information of the determined corresponding module 35*a* to the conversion processor 32*b* (Step S53).

The conversion processor 32*b* converts the data format of the data portion based on the interpretation result of a local communication protocol, using the corresponding module 35*a*, and transmits the converted data portion to the transceiver 31 (Step S54).

The transceiver 31 counts up the number of packet transmitting and receiving operations (the number of transmitting operations) of the corresponding module 35*a* in the module information table 35*c* (Step S55).

The transceiver 31 acquires the device IP address from the device ID with reference to the device information table 35*b* and adds the communication protocol used by the device 2 to the data portion received from the conversion processor 32*b* (adds a header portion) to generate a downlink packet. Then, the transceiver 31 transmits the generated downlink packet to the acquired IP address of the device 2 (Step S56 and Step T15 in FIG. 23). Then, the process ends.

When it is determined in Step S52 that the transmission source is not the application server 8 (the transmission source is the GW management server 9) (a No route in Step S52), the transceiver 33 terminates the communication protocol used in the global network 6, such as an HTTP. Then, the transceiver 33 transmits the data portion (downlink packet) obtained by removing the header portion from the downlink transfer packet to the transceiver 31 (Step S57).

The transceiver 31 transmits the received downlink packet to the device 2 (Step S58).

In addition, the transceiver 31 counts up the number of packet transmitting and receiving operations (the number of transmitting operations) of the corresponding module 35*a* in the module information table 35*c* based on the port number of the transmitted downlink packet (Step S59). Then, the process ends.

In this way, the GW 3 performs the data transmission process when the downlink packet or downlink transfer packet is received from the application server 8 or the GW management server 9.

Next, as illustrated in FIG. 26, the transfer data generation process (Step T17 in FIG. 23) of the GW management server 9 when the transceiver 91 receives the downlink packet from the application server 8 (Step S61 and Step T16-1 in FIG. 23) will be described.

In the transfer data generation process T17, the GW management server 9 responds to the downlink packet received from the application server 8 (Step T16-2 in FIG. 23).

As illustrated in FIG. 26, in the GW management server 9, the transceiver 91 determines the corresponding module 94*a* from the device ID in the downlink packet with reference to the device management table 94*b*. Then, the transceiver 91 transmits the downlink packet and the acquired corresponding module 94*a* to the conversion processor 92*a* (Step S62).

The conversion processor 92*a* acquires the local GW-IP address of the GW 3 from the GW management table 94*d* and acquires the local device IP address of the device 2 from the device management table 94*b*. In addition, the conversion processor 92*a* converts (translates) the data format of the data portion in the downlink packet into a data format which can be interpreted by the device 2 based on the interpretation result of the communication protocol used by the device 2, using the corresponding module 94*a*.

Then, the conversion processor 92*a* transmits the converted data portion of the downlink packet and each acquired IP address to the capsuling processor 9*b* (Step S63).

The capsuling processor 92*b* adds the local GW-IP address and the local device IP address acquired by the conversion processor 92*a* and a local communication protocol to the converted data portion to generate a data portion (capsuling portion) of a downlink transfer packet. In addition, the capsuling processor 92*b* transmits the generated data portion to the transceiver 91 (Step S64).

The transceiver 91 acquires the global GW-IP address including the device ID with reference to the GW management table 94*d*. The transceiver 91 adds, to the data portion received from the capsuling processor 92*b*, a header portion in which the global GW-IP address is set as the transmission destination, the IP address of the GW management server 9 is set as the transmission source, and the communication protocol used in the global network 6, such as an HTTP, is set as the communication protocol to generate a downlink transfer packet.

Then, the transceiver 91 transmits the generated downlink transfer packet to the device 2 (GW 3) (Step S65). Then, the process ends.

In this way, the GW management server 9 performs the transfer data generation process when the downlink packet is transmitted from the application server 8.

[1-6-3] Example of Operation of Module Change Process

Figure 27:
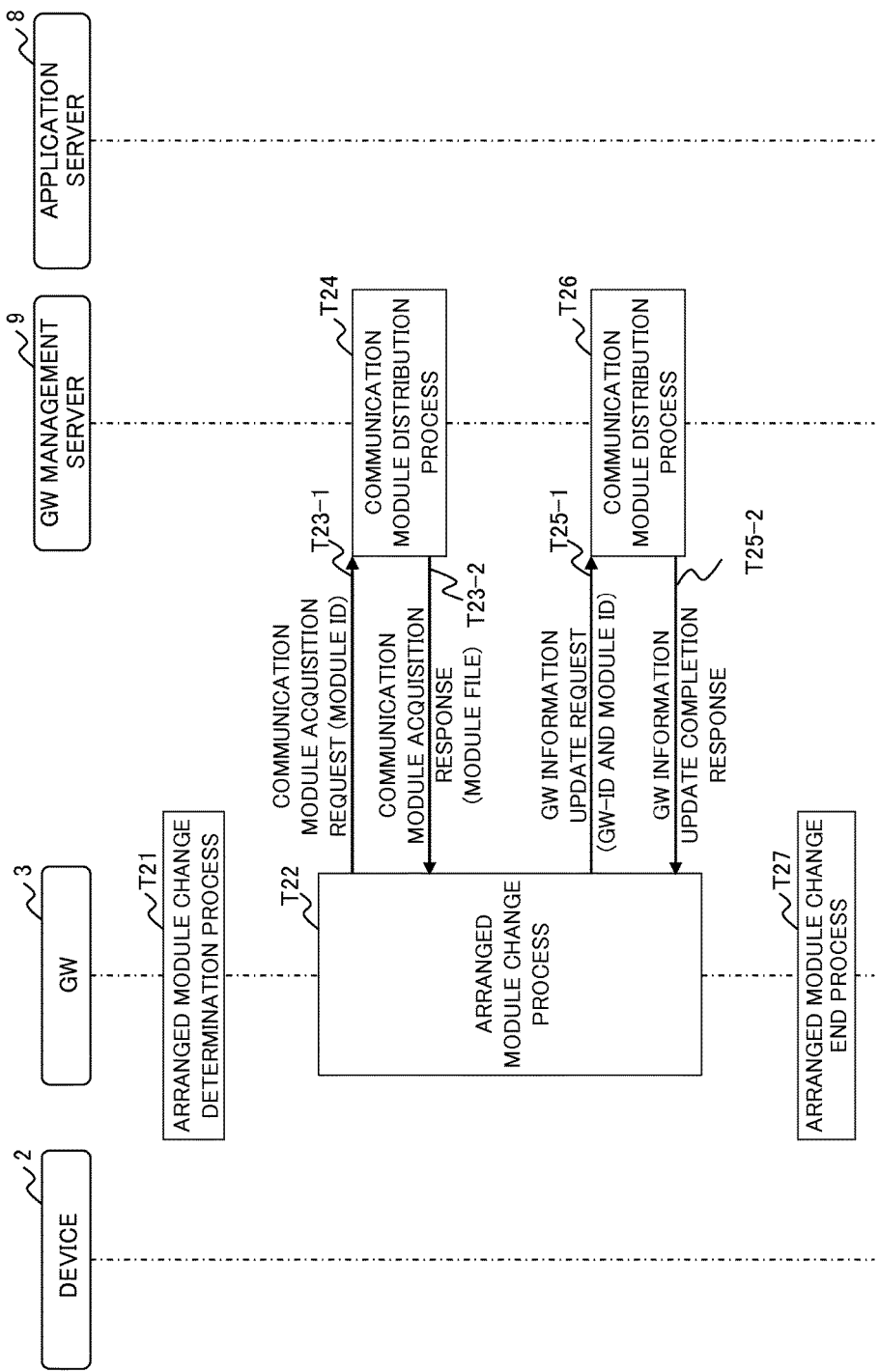
FIG. 27 is a sequence diagram illustrating a module change process in the communication system illustrated in FIG. 1.
Figure 28:
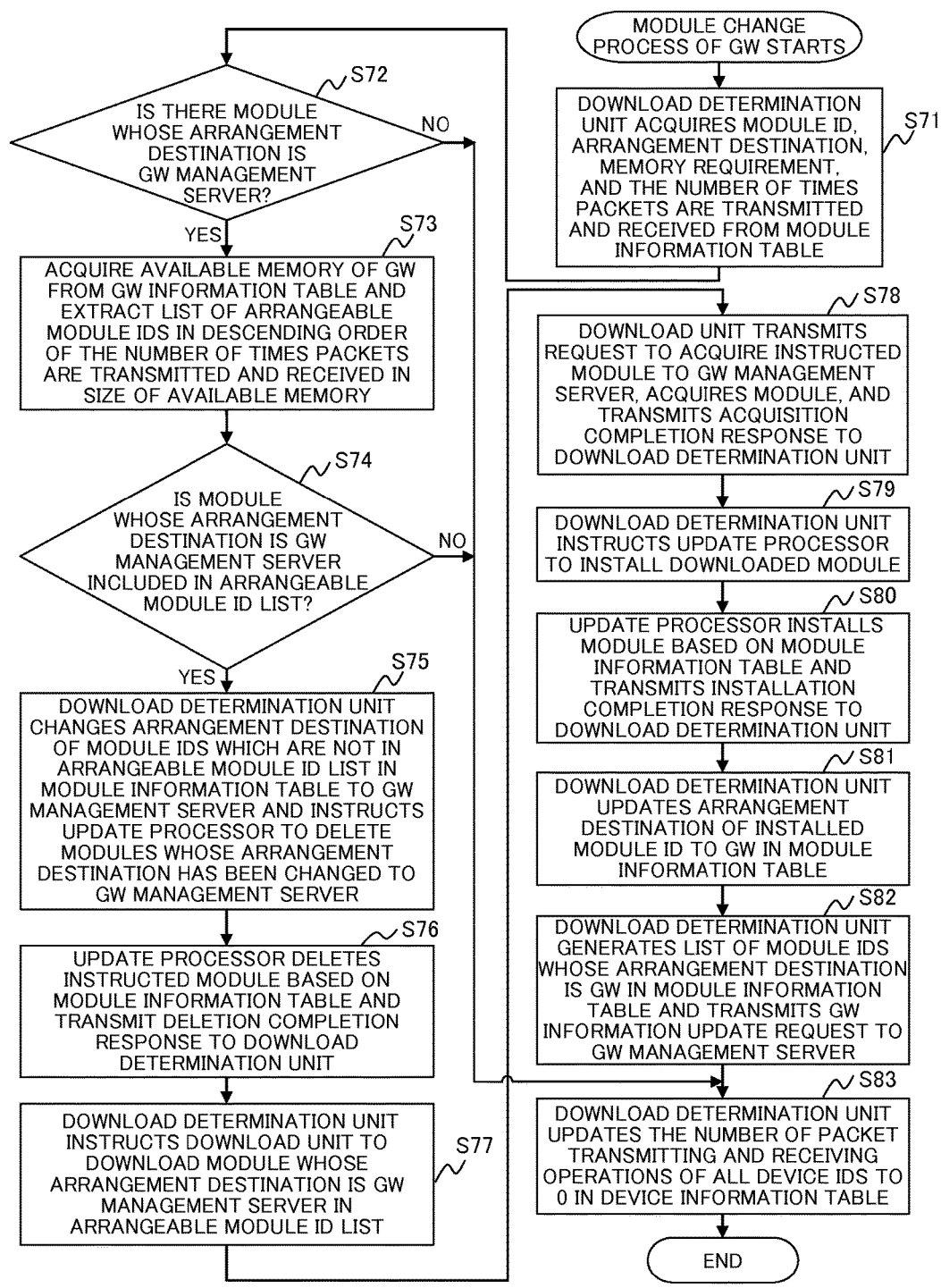
FIG. 28 is a flowchart illustrating the module change process of the GW illustrated in FIG. 27.
Figure 29:
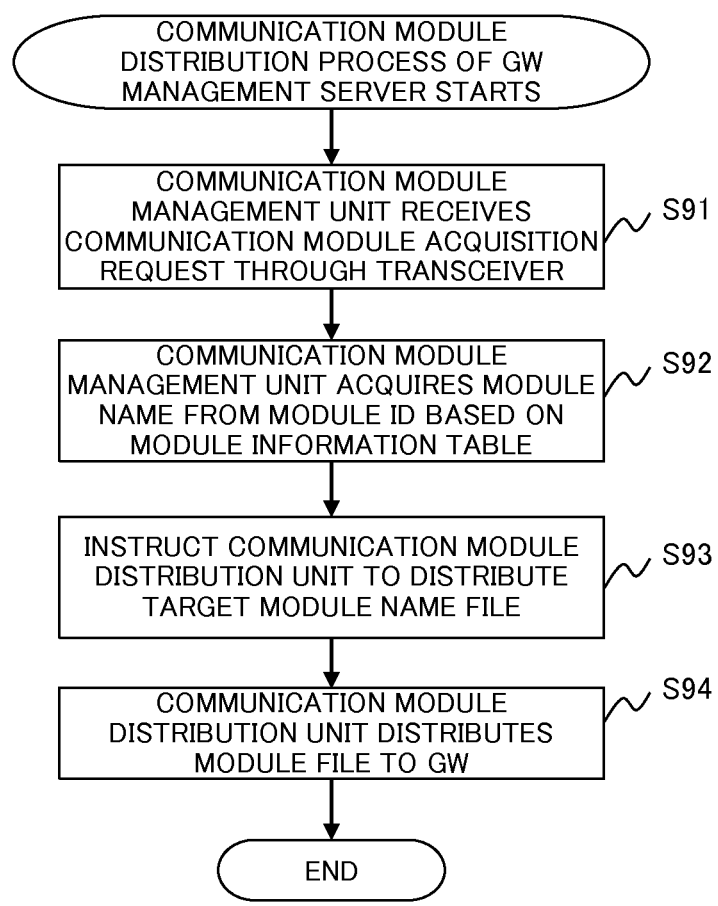
FIG. 29 is a flowchart illustrating a module distribution process of the GW management server illustrated in FIG. 27.
Figure 30:
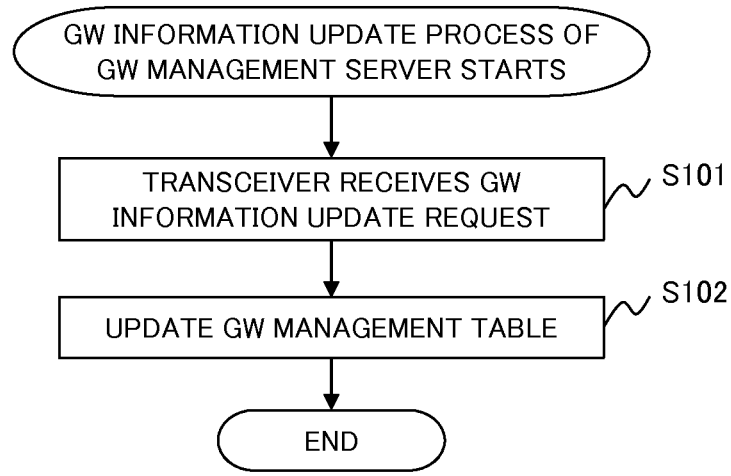
FIG. 30 is a flowchart illustrating a GW information update process of the GW management server illustrated in FIG. 27.

Next, a module change process will be described with reference to FIGS. 27 to 30. FIG. 27 is a sequence diagram illustrating the module change process in the communication system 1 illustrated in FIG. 1. FIG. 28 is a flowchart illustrating the module change process of the GW 3 illustrated in FIG. 27. FIG. 29 is a flowchart illustrating a module distribution process of the GW management server 9 illustrated in FIG. 27. FIG. 30 is a flowchart illustrating a GW information update process of the GW management server 9 illustrated in FIG. 27.

First, as illustrated in FIG. 27, the GW 3 (communication module update unit 34) determines whether to change the arranged module 35*a* at a predetermined time (Step T21).

Specifically, as illustrated in FIG. 28, the download determination unit 34*a* performs a process in Steps S71 to S74.

In Step S71, the download determination unit 34*a* acquires, from the module information table 35*c*, a module ID, an arrangement destination, a memory requirement, and the number of times packets are transmitted and received. Then, the download determination unit 34*a* determines whether there is a module 35*a* whose arrangement destination is the GW management server 9 based on the acquired information of the arrangement destination (Step S72).

When there is a module 35*a* whose arrangement destination is the GW management server 9 (a Yes route in Step S72), the download determination unit 34*a* acquires the available memory of the GW 3 from the GW information table 35*d*. Then, the download determination unit 34*a* makes a list of the module IDs in descending order of the number of times packets are transmitted and received, based on the module information table 35*c*, and sequentially adds the memory requirement of the module ID from the top of the list. When the addition result is greater than the value of the available memory of the GW 3, the download determination unit 34a extracts the module IDs to which the memory requirement is added until the addition result is greater than the value of the available memory of the GW 3 as an arrangeable module ID list from the list (Step S73).

Then, the download determination unit 34a determines whether the module ID whose arrangement destination is the GW management server 9 is included in the arrangeable module ID list with reference to the module information table 35c (Step S74).

Returning to FIG. 27, in the GW 3, when it is determined that the change process is performed based on the change determination result of the arranged module 35a, the communication module update unit 34 performs the process of changing the arranged module 35a (Step T22).

Specifically, as illustrated in FIG. 28, the communication module update unit 34 performs a process in Steps S75 to S82.

When the module ID whose arrangement destination is the GW management server 9 is included in the arrangeable module ID list (a Yes route in Step S74), the download determination unit 34a changes the arrangement destination of the module ID which is not included in the arrangeable module ID list to the GW management server 9 in the module information table 35c. In addition, the download determination unit 34a notifies the update processor 34c of the module ID whose arrangement destination has been changed to the GW management server 9 and instructs the update processor 34c to delete the module 35a from the database 35 (Step S75).

The update processor 34c acquires the module name of the module ID instructed by the download determination unit 34a from the module information table 35c and deletes the module 35a from the database 35. In addition, the update processor 34c returns a deletion completion response to the download determination unit 34a (Step S76).

The download determination unit 34a transmits the module ID whose arrangement destination is the GW management server 9 in the arrangeable module ID list to the download unit 34b and instructs the download unit 34b to download the module 35a with the module ID (Step S77).

The download unit 34b transmits a request to acquire the instructed module ID to the GW management server 9 (Step T23-1 in FIG. 27). When a file of the module 35a (94a) is acquired from the GW management server 9 (Step T23-2 in FIG. 27), the download unit 34b returns an acquisition completion response to the download determination unit 34a (Step S78 in FIG. 28).

The download determination unit 34a transmits the downloaded module ID to the update processor 34c and instructs the update processor 34c to install the module 35a (Step S79).

The update processor 34c acquires the module name of the instructed module ID from the module information table 35c and installs the module 35a. When the installation is completed, the update processor 34c returns an installation completion response to the download determination unit 34a (Step S80).

The download determination unit 34a updates the arrangement destination of the installed module ID to the GW 3 from the module information table 35c (Step 81). In addition, the download determination unit 34a extracts a list of the module IDs whose arrangement destination is the GW 3 from the module information table 35c and instructs the GW management server 9 to update GW information including the extracted module ID list and the GW-ID of the host GW 3 (Step S82 and Step T25-1 in FIG. 27).

When receiving a GW information update completion response from the GW management server 9 (Step T25-2 in FIG. 27), the download determination unit 34a ends the process of changing the arranged module 35a.

In FIG. 27, in the GW 3, the download determination unit 34a performs a process of ending the change of the arranged module 35a (Step T27).

Specifically, as illustrated in FIG. 28, the download determination unit 34a updates the number of packet transmitting and receiving operations of the device IDs of all devices 2 to "0" in the device information table 35b (Step S83) and ends the process.

In this way, the GW 3 performs the process of changing the module 35a.

Next, as illustrated in FIG. 29, in the GW management server 9, the process of the transceiver 91 distributing the module 94a (Step T24 in FIG. 27) when a communication module acquisition request (Step T23-1 in FIG. 27) is received from the GW 3 (Step S91) will be described.

In the GW management server 9, when the communication module acquisition request including the module ID is received, the communication module management unit 93 acquires the module name from the module ID based on the module management table 94c (Step S92). The communication module management unit 93 instructs the communication module distribution unit 93a to distribute the module file of each acquired module name (Step S93).

The communication module distribution unit 93a reads the module file of the instructed module 94a from the database 94 (the memory 90b or the storage unit 90c) and distributes the module file as a communication module acquisition response to the GW 3 (Step S94 and Step T23-2 in FIG. 27). Then, the process ends.

In this way, the GW management server 9 performs the process of distributing the module 94a.

Next, as illustrated in FIG. 30, in the GW management server 9, a GW information update process (Step T26 in FIG. 27) of the transceiver 91 when a GW information update request (Step T25-1 in FIG. 27) is received from the GW 3 (Step S101) will be described.

In the GW management server 9, when the GW information update request including the GW-ID and the module ID provided in the GW 3 is received, the transceiver 91 updates the GW management table 94d (Step S102). Then, the process ends. Specifically, in Step S102, the transceiver 91 adds the received module ID of the module 35a to the communication module ID provided in the GW 3 in the GW management table 94d.

In this way, the GW management server 9 performs the GW information update process.

[1-7] Summary

As described above, according to the communication system 1 of this embodiment, the GW 3 analyzes data transmitted from the device 2 and detects the communication protocol. When the GW 3 does not have a communication protocol, the determination unit 32a transmits the data received from the device 2 to the GW management server 9. The GW management server 9 is provided in the center system 7, has the same communication protocol conversion function as the GW 3, and includes the pseudo GW communication module unit 92 having all software modules 94a for the known communication protocols.

Therefore, even when the GW 3 does not have the module 35*a* corresponding to the communication protocol used by the device 2, it is possible to achieve the communication between the device 2 and the application server 8.

[2] Others

The preferred embodiment of the invention has been described above. However, the invention is not limited to the above-mentioned specific embodiment, but various modifications and changes of the invention can be made without departing from the scope and spirit of the invention.

For example, the operation of the communication system 1 is not limited to the above-mentioned examples which have been described with reference to FIGS. 19 to 30 and the processing order may be appropriately changed, without departing from the scope and spirit of the invention.

In addition, a computer (including a CPU, an information processing device, and various types of terminals) may execute a predetermined program to implement some or all of the functions of the GW 3 and the GW management server 9 according to the embodiment.

The program is recorded on a computer-readable recording medium (for example, the recording medium 30*h* or/and the recording medium 90*h* illustrated in FIGS. 2 and 3), such as a flexible disk, a CD (for example, a CD-ROM, a CD-R, or a CD-RW), a DVD (for example, a DVD-ROM, a DVD-RAM, a DVD-R, a DVD-RW, a DVD+R, or a DVD+RW), or a Blu-ray disc, and is then provided. In this case, the computer reads the program from the recording medium, transmits the program to an internal storage device or an external storage device, stores the program in the storage device, and uses the program. The program may be divided into parts corresponding to the functions of the GW 3 and the GW management server 9 and the divided parts may be recorded on, for example, the recording media 30*h* and 90*h* illustrated in FIGS. 2 and 3.

The concept of the computer includes hardware and an operating system (OS) and the computer means hardware which operates under the control of the OS. When the OS is not needed and only an application program operates hardware, the hardware corresponds to the computer. The hardware includes at least a microprocessor, such as a CPU, and a means for reading the computer program recorded on the recording medium. The program includes a program code which causes the above-mentioned computer to implement various functions of the GW 3 and the GW management server 9 according to the embodiment. Some of the functions may not be implemented by the application program, but may be implemented by the OS.

According to an embodiment, it is possible to enable the communication of a terminal device even when a communication device that can convert a communication rule of data transmitted and received between the terminal device and a control device does not have a control element corresponding to a communication rule used by the terminal device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device that controls communication of data which is transmitted and received between a plurality of terminal devices and a control device, the control device controlling the plurality of terminal devices through a network, the communication device comprising:

a processor; and a memory configured to store a protocol conversion program which is configured to convert a data format, wherein the processor determines whether the memory stores a first protocol-conversion program which is configured to convert a data format of uplink data between a first data format corresponding to a first communication rule and a second data format corresponding to a second communication rule, the uplink data including a header corresponding to the first communication rule and being transmitted from one of the plurality of terminal devices to the control device, when the memory does not store the first protocol conversion program as a result of the determining, the processor generates uplink transfer data by encapsulating the uplink data and adding a header corresponding to the second communication rule to the encapsulated uplink data, the processor transmits the uplink transfer data to a management device through the network, the management device including the first protocol-conversion program, obtaining the uplink data by removing the header corresponding to the second communication rule from the uplink transfer data, converting the data format of the uplink data from the first data format to the second data format based on the first protocol conversion program, and transmitting the uplink data to the control device, the processor counts an amount of communication of the data which is transmitted and received for a predetermined period for each kind of communication protocol used by the plurality of terminal devices, the memory stores at least one protocol conversion program among one or more protocol conversion programs corresponding to kinds of communication protocols used by the plurality of terminal devices, the protocol conversion program converting a data format of data between two communication rules used in one of the plurality of terminal devices and the control device, the processor determines one or more protocol conversion programs to be stored in the memory in a range not exceeding storage capacity of the memory of the communication device in order of a protocol conversion program associated with a kind of communication protocol having a larger amount of communication in the counting, and deletes one or more protocol conversion programs except for one or more determined protocol conversion programs from the memory, and when the one or more determined protocol conversion programs are not stored in the memory, the processor acquires the one or more determined protocol conversion programs from the management device and stores one or more acquired protocol conversion programs in the memory.

2. The communication device according to claim 1, wherein when the memory stores the first protocol conversion program as the result of the determining, the processor converts the data format of the uplink data from the first data format to the second data format using the first protocol conversion program stored in the memory and transmits the converted uplink data to the control device through the network.

3. The communication device according to claim 2, wherein
the processor receives downlink transfer data from the management device through the network,
the downlink transfer data being generated by the management device by adding the header corresponding to the second communication rule to downlink data, the downlink data including a header corresponding to the first communication rule,
the processor extracts the downlink data from the downlink transfer data by removing the header corresponding to the second communication rule from the received downlink transfer data, and
the processor transmits the extracted downlink data to the terminal device.

4. The communication device according to claim 3, wherein
the processor receives the downlink data for the second communication rule, which is transmitted from the control device to the terminal device, through the network,
the processor converts the data format of the downlink data received from the control device into the first data format using the first protocol conversion program, and
the processor transmits the converted downlink data to the terminal device.

5. A processing method that is performed in a communication system which performs communication between a plurality of terminal devices and a control device, the control device controlling the plurality of terminal devices through a network, the processing method comprising:
determining whether a communication device has a first protocol conversion program, the communication device controlling communication of data transmitted and received between the plurality of terminal devices and the control device, the first protocol conversion program being configured to convert a data format of uplink data between a first data format corresponding to a first communication rule and a second data format corresponding to a second communication rule, the uplink data including a header corresponding to the first communication rule, and being transmitted from one of the plurality of terminal devices to the control device;
generating uplink transfer data by encapsulating the uplink data and adding a header corresponding to the second communication rule to the encapsulated uplink data when the communication device does not have the first protocol conversion program as a result of the determining;
transmitting the uplink transfer data to a management device through the network, the management device including the first protocol conversion program, obtaining the uplink data by removing the header corresponding to the second communication rule from the uplink transfer data, converting the data format of the uplink data from the first data format to the second data format based on the first protocol conversion program, and transmitting the uplink data to the control device;
counting an amount of communication of the data which is transmitted and received by the communication device for a predetermined period for each kind of communication protocol used by the plurality of terminal devices,
determining one or more protocol conversion programs to be stored in a memory of the communication device in a range not exceeding storage capacity of the memory in order of program associated with a kind of communication protocol having a larger amount of communication in the counting, the memory being configured to store at least one protocol conversion program among one or more protocol conversion programs corresponding to kinds of communication protocols used by the plurality of terminal devices, the protocol conversion program converting a data format of data between two communication rules used in one of the plurality of terminal devices and the control device;
deleting one or more protocol conversion programs except for one or more determined protocol conversion programs from the memory; and
when the one or more determined protocol conversion programs are not stored in the memory, acquiring the one or more determined protocol conversion programs from the management device and storing one or more acquired protocol conversion programs in the memory.

6. The processing method according to claim 5, wherein the processing method further comprises:
converting, when the communication device has the first protocol conversion program as the result of the determining, the data format of the uplink data from the first data format to the second data format using the first protocol conversion program, and
transmitting the converted uplink data to the control device through the network.

7. The processing method according to claim 6, wherein the processing method further comprises:
receiving downlink transfer data from the management device through the network, the downlink transfer data being generated by the management device by adding the header corresponding to the second communication rule to downlink data, the downlink data including a header corresponding to the first communication rule,
extracting the downlink data from the downlink transfer data by removing the header corresponding to the second communication rule from the received downlink transfer data, and
transmitting the extracted downlink data to the terminal device.

8. The processing method according to claim 7, wherein the processing method further comprises:
receiving downlink data for the second communication rule, which is transmitted from the control device to the terminal device, through the network,
converting the data format of the received downlink data into the first data format using the first protocol conversion program, and
transmitting the converted downlink data to the terminal device.

9. A non-transitory computer-readable recording medium having stored therein a processing program for causing a computer to execute a process for controlling communication of data transmitted and received between a plurality of terminal devices and a control device, the control device controlling the plurality of terminal devices through a network, the process comprising:
determining whether the computer has a first protocol conversion program, the first protocol conversion program being configured to convert a data format of uplink data between a first data format corresponding to a first communication rule and a second data format corresponding to a second communication rule, the uplink data including a header corresponding to the first communication rule, and being transmitted from one of the plurality of terminal devices to the control device;

generating uplink transfer data by encapsulating the uplink data and adding a header corresponding to the second communication rule to encapsulated uplink data when the first computer does not have the first protocol conversion program as a result of the determining;

transmitting the uplink transfer data to a management device through the network, the management device including the first protocol conversion program, obtaining the uplink data by removing the header corresponding to the second communication rule from the uplink transfer data, converting the data format of the uplink data from the first data format to the second data format based on the first protocol conversion program, and transmitting the uplink data to the control device;

counting an amount of communication of the data which is transmitted and received by the computer for a predetermined period for each kind of communication protocol used by the plurality of terminal devices, determining one or more protocol conversion programs to be stored in a memory of the communication device in a range not exceeding storage capacity of the memory in order of program associated with a kind of communication protocol having a larger amount of communication in the counting, the memory being configured to store at least one protocol conversion program among one or more protocol conversion programs corresponding to kinds of communication protocols used by the plurality of terminal devices, the protocol conversion program converting a data format of data between two communication rules used in one of the plurality of terminal devices and the control device;

deleting one or more protocol conversion programs except for one or more determined protocol conversion programs from the memory; and when the one or more determined protocol conversion programs are not stored in the memory, acquiring the one or more determined protocol conversion programs from the management device and storing one or more acquired protocol conversion programs in the memory.

* * * * *